US011842025B2

(12) United States Patent
Kitazawa et al.

(10) Patent No.: US 11,842,025 B2
(45) Date of Patent: Dec. 12, 2023

(54) INFORMATION PROCESSING DEVICE AND INFORMATION PROCESSING METHOD

(71) Applicant: SONY GROUP CORPORATION, Tokyo (JP)

(72) Inventors: Yuji Kitazawa, Tokyo (JP); Naoki Shibuya, Tokyo (JP)

(73) Assignee: SONY GROUP CORPORATION, Tokyo (JP)

(*) Notice: Subject to any disclaimer, the term of this patent is extended or adjusted under 35 U.S.C. 154(b) by 0 days.

(21) Appl. No.: 17/631,040

(22) PCT Filed: Jun. 2, 2020

(86) PCT No.: PCT/JP2020/021749
§ 371 (c)(1),
(2) Date: Jan. 28, 2022

(87) PCT Pub. No.: WO2021/024594
PCT Pub. Date: Feb. 11, 2021

(65) Prior Publication Data
US 2022/0317826 A1     Oct. 6, 2022

(30) Foreign Application Priority Data
Aug. 6, 2019   (JP) ................. 2019-144169

(51) Int. Cl.
*G06F 3/0481* (2022.01)
*G06F 9/451* (2018.01)

(52) U.S. Cl.
CPC ........... *G06F 3/0481* (2013.01); *G06F 9/453* (2018.02)

(58) Field of Classification Search
CPC .............................. G06F 3/0481; G06F 9/453
See application file for complete search history.

(56) References Cited

U.S. PATENT DOCUMENTS

| 7,620,894 | B1* | 11/2009 | Kahn | G06F 3/04895 715/708 |
| 8,533,604 | B1* | 9/2013 | Parenti | G06F 9/451 715/741 |
| 10,698,706 | B1* | 6/2020 | Rabe | G06F 3/0484 |
| 10,729,502 | B1* | 8/2020 | Wolf | A61B 34/10 |
| 10,956,833 | B1* | 3/2021 | Yamane | G06F 8/77 |
| 11,257,491 | B2* | 2/2022 | Kong | G10L 15/22 |
| 11,436,521 | B2* | 9/2022 | Tanglertsampan | G06Q 50/01 |

(Continued)

FOREIGN PATENT DOCUMENTS

| CN | 1497434 A | 5/2004 |
| EP | 1408674 A2 | 4/2004 |

(Continued)

OTHER PUBLICATIONS

International Search Report and Written Opinion of PCT Application No. PCT/JP2020/021749, dated Aug. 25, 2020, 10 pages of ISRWO.

*Primary Examiner* — Tadesse Hailu
(74) *Attorney, Agent, or Firm* — CHIP LAW GROUP

(57) ABSTRACT

Provided is an information processing device including a control unit that performs processing using a learning model trained by machine learning for a user operation in an application and determines operation support information for operation support to be presented to a user according to a result of the processing.

15 Claims, 15 Drawing Sheets

(56) References Cited

U.S. PATENT DOCUMENTS

| | | | |
|---|---|---|---|
| 2004/0070591 A1 | 4/2004 | Kato | |
| 2013/0120449 A1* | 5/2013 | Ihara | G06F 11/0727 345/633 |
| 2015/0088799 A1 | 3/2015 | Zhou et al. | |
| 2017/0017353 A1* | 1/2017 | Holzer | G06F 9/451 |
| 2017/0046374 A1* | 2/2017 | Fletcher | G06F 9/542 |
| 2018/0039517 A1* | 2/2018 | Koyanagi | G06F 9/505 |
| 2019/0259293 A1* | 8/2019 | Hellman | G06F 3/0481 |
| 2019/0373404 A1* | 12/2019 | Katsu | H04M 3/42 |
| 2020/0090542 A1* | 3/2020 | Clevenger | G09B 5/065 |
| 2020/0302924 A1* | 9/2020 | Andreica | G10L 15/22 |
| 2022/0171984 A1* | 6/2022 | Takahashi | G06N 20/00 |

FOREIGN PATENT DOCUMENTS

| | | |
|---|---|---|
| JP | 08-036548 A | 2/1996 |
| JP | 2004-152276 A | 5/2004 |
| JP | 2006-338233 A | 12/2006 |
| JP | 2007-555364 B2 | 7/2008 |
| JP | 2015-041317 A | 3/2015 |
| JP | 2015-064715 A | 4/2015 |

\* cited by examiner

INFORMATION PROCESSING DEVICE AND INFORMATION PROCESSING METHOD

CROSS REFERENCE TO RELATED APPLICATIONS

This application is a U.S. National Phase of International Patent Application No. PCT/JP2020/021749 filed on Jun. 2, 2020, which claims priority benefit of Japanese Patent Application No. JP 2019-144169 filed in the Japan Patent Office on Aug. 6, 2019. Each of the above-referenced applications is hereby incorporated herein by reference in its entirety.

TECHNICAL FIELD

The present disclosure relates to an information processing device, an information processing method, and a program.

BACKGROUND ART

Conventionally, techniques for supporting user operations have been proposed in various fields. For example, Patent Document 1 below discloses a technique for estimating a function that a user originally desires to execute and performing operation support even in a case where the user performs an incorrect operation in order to execute a predetermined function regarding an operation of an electronic device.

CITATION LIST

Patent Document

Patent Document 1: Japanese Patent Application No. 2007-555364

SUMMARY OF THE INVENTION

Problems to be Solved by the Invention

However, as a technique for supporting a user operation in an application (for example, a PC application for business use), a technique for displaying a use guide at the time of first activation of the application is known. Such a guide is generally displayed only for the first time, and the pattern of the guide is also fixed, so that the operability of the user cannot be improved.

Therefore, for example, it is conceivable to present operation support information to the user when the user makes a mistake in the operation. However, even in this case, when the user makes the same mistake, for example, the fixed operation support information is always presented, so that it is difficult to improve the operability of the user. That is, the technique for presenting the operation support information to the user cannot be optimized for each individual.

Therefore, an object of the present disclosure is to provide an information processing device, an information processing method, and a program capable of dramatically improving operability of a user in an application.

Solutions to Problems

The present disclosure is
an information processing device including
a control unit that performs processing using a learning model trained by machine learning for a user operation in an application and determines operation support information for operation support to be presented to a user according to a result of the processing.

Furthermore, the present disclosure is
an information processing method including,
by a control unit, performing processing using a learning model trained by machine learning for a user operation in an application and determining operation support information for operation support to be presented to a user according to a result of the processing.

Furthermore, the present disclosure is
a program for causing a computer to execute an information processing method including, by a control unit, performing processing using a learning model trained by machine learning for a user operation in an application and determining operation support information for operation support to be presented to a user according to a result of the processing.

MODE FOR CARRYING OUT THE INVENTION

Hereinafter, embodiments of the present disclosure will be described with reference to the drawings. The description will be given in the following order.
<1. First Embodiment>
<2. Second Embodiment>
<3. Third Embodiment>
<4. Fourth Embodiment>
<5. Fifth Embodiment>
<6. Modification>

Note that embodiments and the like to be described below are favorable specific examples of the present disclosure, and content of the present disclosure is not limited to these embodiments and the like.

1. First Embodiment

[Schematic Configuration of Entire System]

Figure 1:
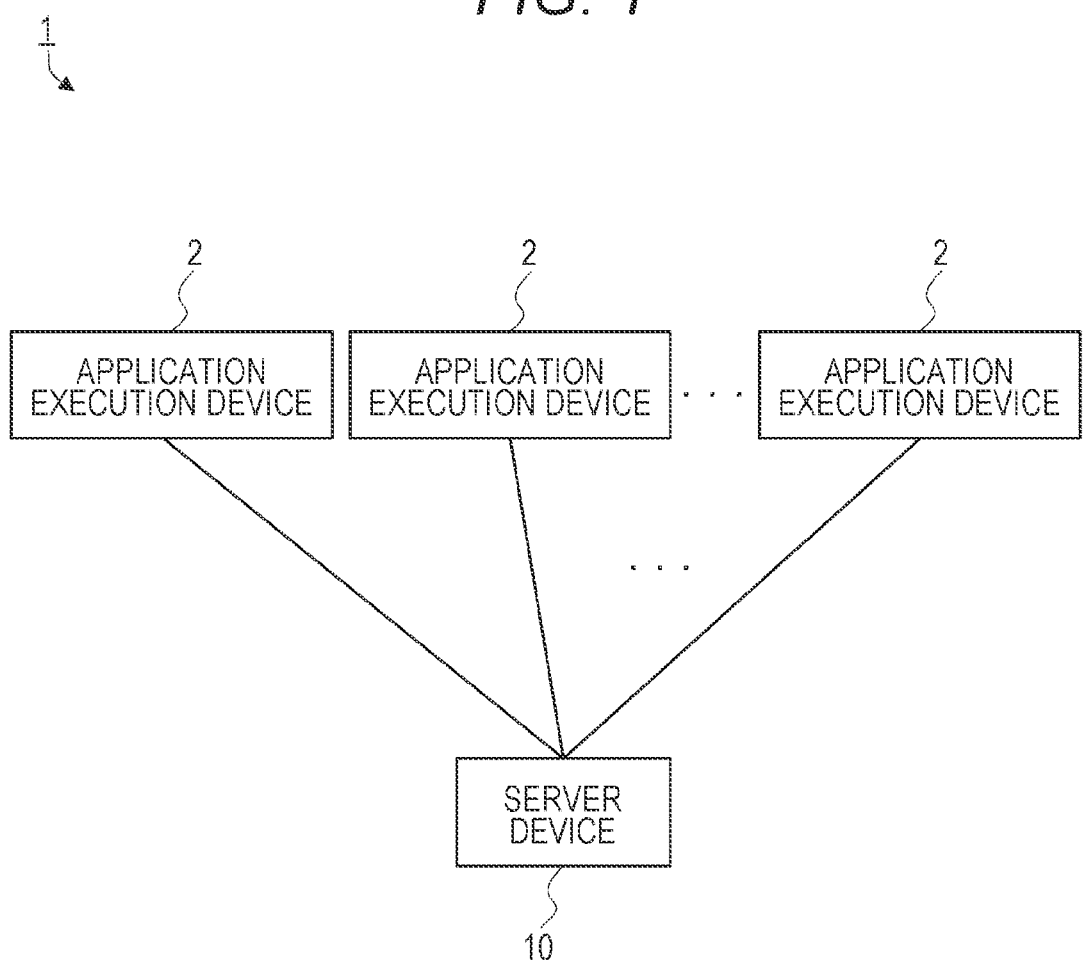
FIG. 1 is a diagram illustrating a configuration example of an operation support system according to a first embodiment.

FIG. 1 is a diagram illustrating a configuration example of an operation support system according to a first embodiment of the present disclosure. An operation support system 1 illustrated in FIG. 1 is for supporting a user operation in an application. The operation support system 1 includes a plurality of application execution devices 2 and a server device 10 connected with the application execution devices 2 via a network (for example, connection via the Internet). Specifically, each of the application execution devices 2 and the server device 10 is configured by a personal computer (PC). Note that these devices are not limited to PCs and may be configured by an information processing device such as a dedicated device for business use or a mobile terminal. Furthermore, the form of network connection between each application execution device 2 and the server device 10 may be wired, wireless, or the like. With such a configuration, in the operation support system 1, data can be transmitted and received between each application execution device 2 and the server device 10.

The application execution device 2, which is an example of an information processing device, is capable of executing an application (described below) and is configured to be able to support a user operation in the application.

The server device 10 provides the application execution device 2 with data necessary for processing in the application execution device 2 to be described below.

[Configuration of Application Execution Device 2]

Figure 2:
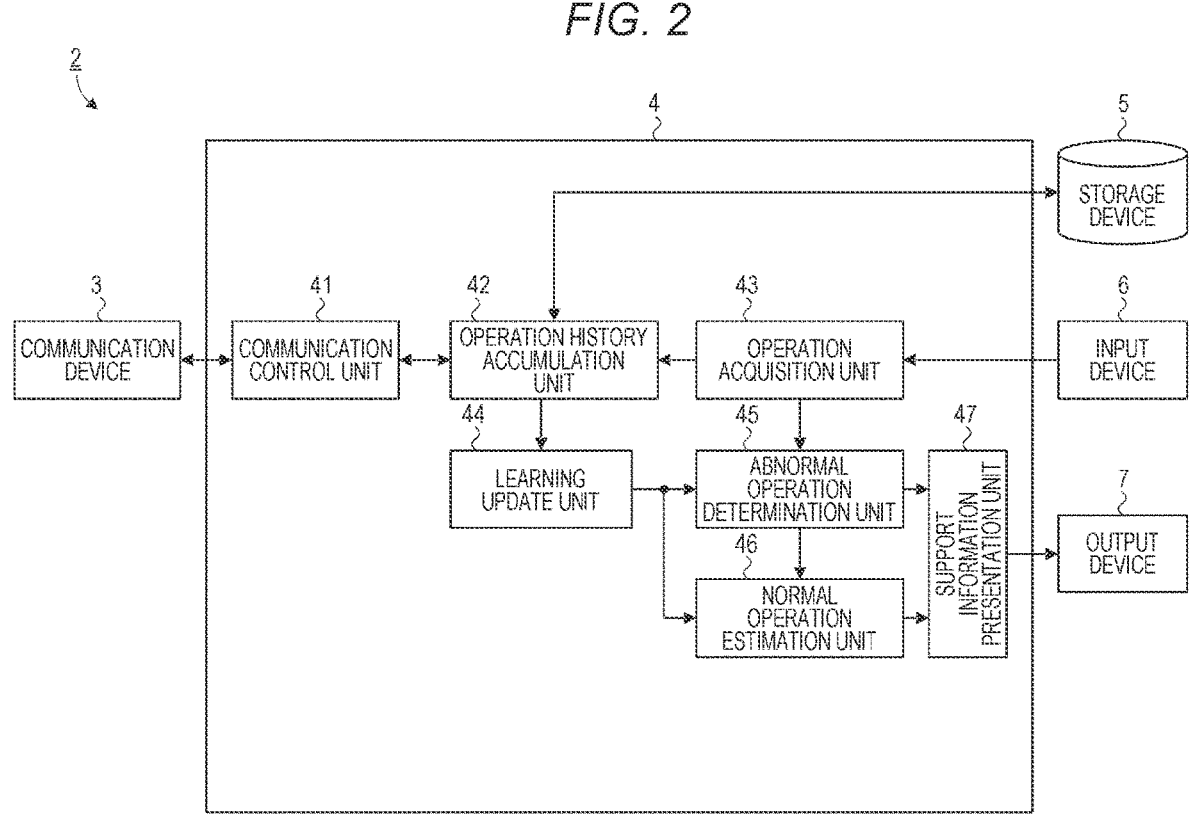
FIG. 2 is a block diagram illustrating a configuration example of an application execution device according to the first embodiment.

FIG. 2 is a block diagram illustrating a configuration example of the application execution device 2 according to the first embodiment. The application execution device 2 includes a communication device 3, a control device 4 corresponding to a control unit, a storage device 5, an input device 6, and an output device 7. Note that these components of the application execution device 2 are not limited to being separately configured as illustrated, and all or some of the components may be integrally configured. Furthermore, connection between the components may be via a network regardless of wired, wireless connection, or the like.

The communication device 3 is a device for network connection with the server device 10 illustrated in FIG. 1. The application execution device 2 is configured to be able to transmit and receive various data to or from the server device 10 via the network by the communication device 3.

The control device 4 performs calculation, control, and the like according to various programs stored in the storage device 5 and the like, and performs each processing in the application execution device 2. For example, the control device 4 includes a central processing unit (CPU). Specifically, the control device 4 performs processing using a learning model trained by machine learning for user operations in an application, and determines operation support information for operation support to be presented to the user according to a result of the processing. Then, the control device 4 performs processing for the application and operation support processing for supporting the user operation in the application, using the determined operation support information.

The storage device 5 stores various computer programs, data necessary for processing by the various computer programs, and the like. For example, the storage device 5 includes a hard disk drive (HDD), a solid state drive (SSD), or the like. Specifically, the storage device 5 stores an application, a computer program for the operation support processing, data necessary for the processing, and the like. Note that, for easy understanding, the computer program for the operation support processing will be described here as being separate from the application, but may be incorporated into the application or may be incorporated later into the application.

Furthermore, the application and the computer program for the operation support processing may be stored in a computer-readable recording medium and read and executed by the application execution device 2. The recording medium is, for example, a magnetic disk, an optical disk, a magneto-optical disk, a flash memory, or the like. Furthermore, the above-described computer program may be delivered via, for example, a network without using a recording medium.

The input device 6 is used by the user in the user operation in the application. For example, the input device 6 includes at least one or more operation devices such as a mouse and a keyboard.

The output device 7 corresponding to an output unit is for providing the user with various types of information in the processing in the application and presenting the operation support information for supporting the user operation in the operation support processing. Specifically, the output device 7 includes a speaker and a display. Note that the configuration of the output device 7 is not limited thereto as long as the output device 7 includes one or more output devices, and may use other devices or may be a combination of other output devices. Furthermore, separate output devices may be used as the output device for providing various types of information in the application and the output device for presenting the operation support information in the operation support processing.

[Description of Application]

Here, the application executed by the application execution device 2 will be described. The application executed by the application execution device 2, specifically, the application (tool software) stored in the above-described storage device 5 is, for example, a PC application for business use. This application applies processing according to a user operation to input information and outputs information. The type, use, and the like of the application are not limited to specific type and use and can be applied to various types and uses. This application uses a user interface (UI) for a user operation that accepts a user operation, specifically, a user operation using the input device 6 to the application.

Figure 3:
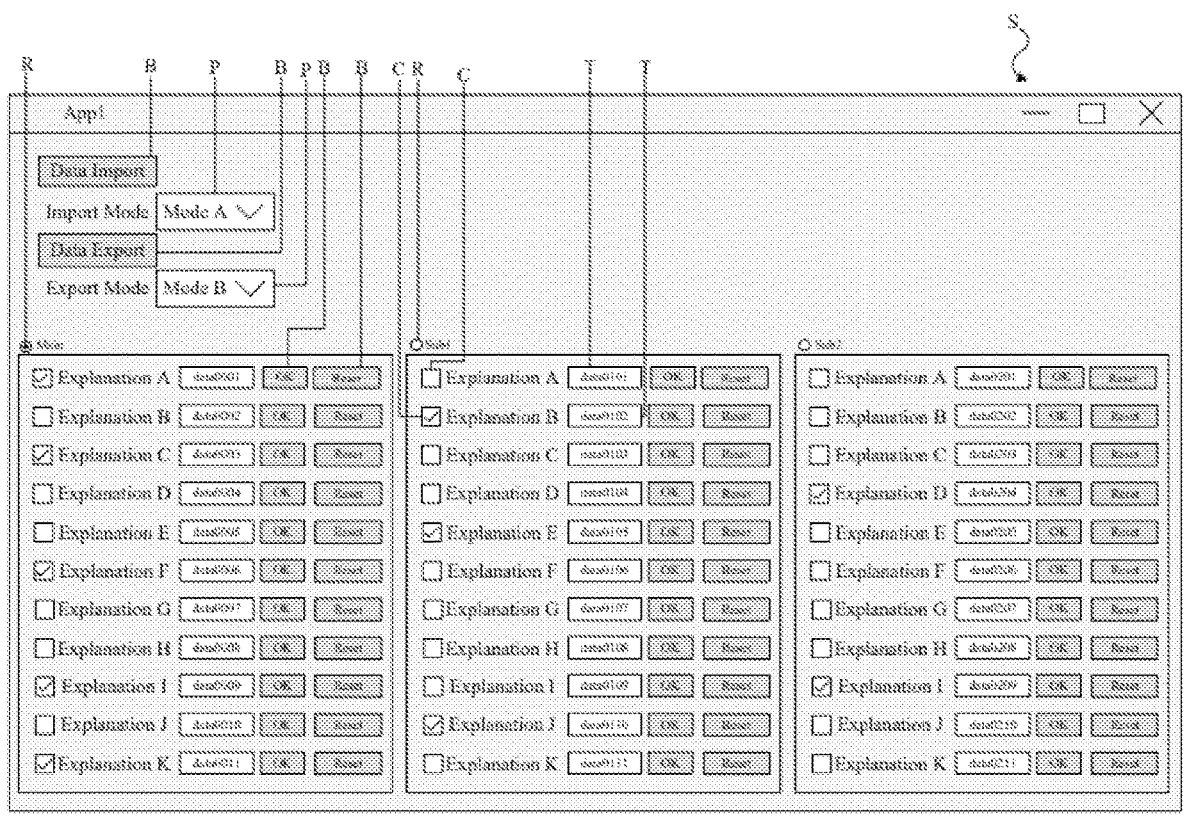
FIG. 3 is a diagram illustrating a configuration example of a UI used in an application.

FIG. 3 is a diagram illustrating a configuration example of the UI used in the application. Specifically, an operation screen S illustrated in FIG. 3 is displayed on a display constituting the above-described output device 7. For example, the operation screen S illustrated in FIG. 3 is an edit screen for editing fetched data, and is displayed by an application for data editing. As illustrated, the application includes a plurality of UI components on the operation screen S, and the user operates the UI components using the input device 6 and causes the application to execute processing corresponding to the operation.

Note that, in the user operation in the application, the UI is favorably configured to be intuitively easy to understand. At present, with the spread of, for example, touch panels adopted in smartphones and the like, the number of UI components having excellent operability, such as taps, swipes, and pinch-in and pinch-out, is increasing.

However, as illustrated in FIG. 3, many applications use primitive UI components (specifically, a button B, a pull-down menu P, a radio button R, a checkbox C, a textbox T, and the like illustrated in FIG. 3) that have been used before the UI components having excellent operability appear. In such an application, it is necessary to operate each UI component according to a procedure, but it is difficult to intuitively understand an operation method. In particular, in the case of an application for business use, description of setting items and the like are hardly given in many cases. Therefore, the user who newly works (performs an operation in the application) needs time to get used to the operation of such a UI.

In that case, one solution is to update only the UI in an easy-to-understand manner while keeping the functions of the application as they are, but it takes some time and effort to reconstruct the UI. Furthermore, for example, if the UI is changed in a case where a large number of users use the application, there is a possibility that a burden is imposed on the users who are accustomed to the application before changing the UI. Therefore, it is favorable to support the operation of an unfamiliar user while keeping the UI as it is.

Therefore, the application execution device 2 illustrated in FIG. 2 supports the user operation in the application by causing the control device 4 to execute the above-described operation support processing, and improves the operability. More specifically, the control device 4 performs processing using a learning model trained by machine learning at the time of the user operation in an application, and determines operation support information for operation support to be presented to the user according to a processing result. Specifically, the control device 4 improves the UI operability in the application by presenting an alert for an abnormal operation (operation considered to be wrong) or presenting a candidate for a normal operation (candidate for next operation considered to be correct) in place of the abnormal operation.

[Configuration of Control Device 4]

As illustrated in FIG. 2, the control device 4 includes a communication control unit 41, an operation history accumulation unit 42, an operation acquisition unit 43, a learning update unit 44, an abnormal operation determination unit 45, a normal operation estimation unit 46, and a support information presentation unit 47 as functional blocks that function with execution of the computer program for the operation support processing.

The communication control unit 41 has a function to control the communication device 3 to transmit and receive data associated with the operation support processing to and from the server device 10. Specifically, the communication control unit 41 acquires data for machine learning (first learning data and second learning data to be described below) from the server device 10, and provides the acquired data to the operation history accumulation unit 42. Furthermore, the communication control unit 41 transmits, to the server device 10, operation data regarding the user operation in the application provided from the operation history accumulation unit 42. The machine learning, the learning data, and the operation data will be described in detail later.

The operation history accumulation unit 42 has a function to store the data for machine learning provided from the communication control unit 41 in the storage device 5. Furthermore, the operation history accumulation unit 42 acquires operation data from the operation acquisition unit 43, and accumulates the acquired operation data in the storage device 5. Specifically, the operation history accumulation unit 42 stores the operation data in the storage device 5 so that an operation order of pieces of the operation data is discriminative. For example, the data for machine learning and the operation data are stored in a database in the storage device 5.

Moreover, the operation history accumulation unit 42 has a function to provide the operation data acquired from the operation acquisition unit 43 to the communication control unit 41. Note that a plurality of pieces of the operation data (operation history data) collected in the operation order may be provided to the communication control unit 41 at the end of the application or every predetermined period. Furthermore, a setting of not providing the operation data to the server device 10 via the communication device 3 may be made switchable by the user. As a result, an operation procedure that is not desired to be disclosed can be concealed.

Furthermore, the operation history accumulation unit 42 has a function to read the operation data (learning data) necessary for machine learning from the storage device 5 and provide the read operation data to the learning update unit 44.

The operation acquisition unit 43 has a function to acquire raw data of the user operation in the application from the input device 6, generate operation data using the acquired raw data, and provide the generated operation data to the operation history accumulation unit 42 and the abnormal operation determination unit 45.

The learning update unit 44 has a function to perform machine learning using the operation data provided from the operation history accumulation unit 42 and a function to provide a learning model trained by the machine learning to the abnormal operation determination unit 45 and the normal operation estimation unit 46. Specifically, the learning update unit 44 performs machine learning at the end of the application. Note that the timing of the machine learning is not limited to the end of the application, and the machine learning may be performed at predetermined timing after the user operation, for example, every predetermined period such as once a day.

The abnormal operation determination unit 45 has a function to perform determination processing of determining whether or not the user operation in the application is a normal operation, using the above-described learning model. Specifically, when a user operation is performed by the input device 6, the abnormal operation determination unit 45 determines whether or not the operation is a normal operation, using the operation data provided from the operation acquisition unit 43 and the learning model provided from the learning update unit 44, and performs processing according to a determination result. For example, the abnormal operation determination unit 45 has a function to perform determination using the operation data of n times (for example, ten times) of operations including the operation data provided from the operation acquisition unit 43 and the latest operation data (for example, data stored in a readable memory) and the learning model, and notify the support information presentation unit 47 that the user operation is an abnormal operation in the case where the abnormal operation is determined and provide the operation data provided from the operation acquisition unit 43 to the normal operation estimation unit 46. Here, the operation data of n times of operations is used because a certain number (n times) of operation history is required in order to determine whether or not the user operation is a normal operation.

The normal operation estimation unit 46 is for determining, as operation support information, a candidate for a normal operation in place of the user operation when the user operation in the application is not a normal operation, and has a function to perform estimation processing of estimating the candidate for a normal operation using the above-described learning model. Specifically, the normal operation estimation unit 46 has a function to estimate the candidate for a normal operation using the operation data provided from the abnormal operation determination unit 45 and the learning model provided from the learning update unit 44, and provide normal operation information indicating the estimated candidate for a normal operation to the support information presentation unit 47, in the case where the abnormal operation determination unit 45 determines that the user operation is an abnormal operation. For example, the normal operation estimation unit 46 estimates the candidate for a normal operation using the operation data of n times of operations including the operation data provided from the abnormal operation determination unit 45 and the latest operation data (for example, data stored in the readable memory) and the learning model.

The support information presentation unit 47 has a function to present the operation support information to the user using the output device 7. Specifically, when receiving the notification of abnormal operation from the abnormal operation determination unit 45, the support information presentation unit 47 causes the output device 7 to output an alert to the user as the operation support information. Furthermore, the support information presentation unit 47 causes the output device 7 to output, as the operation support information, an operation guide indicating the candidate for a normal operation based on the normal operation information provided from the normal operation estimation unit 46.

[Machine Learning and its Use]

The above-described machine learning can be implemented by, for example, an auto encoder (self-encoder) used in the field of abnormality detection. Specifically, the auto encoder performs unsupervised learning using only input data as training data, and has a characteristic that the autoencoder can restore itself when normal data is input after learning with only normal data (operation data of normal operation). Hereinafter, an example of machine learning by the auto encoder will be described.

Figure 4:
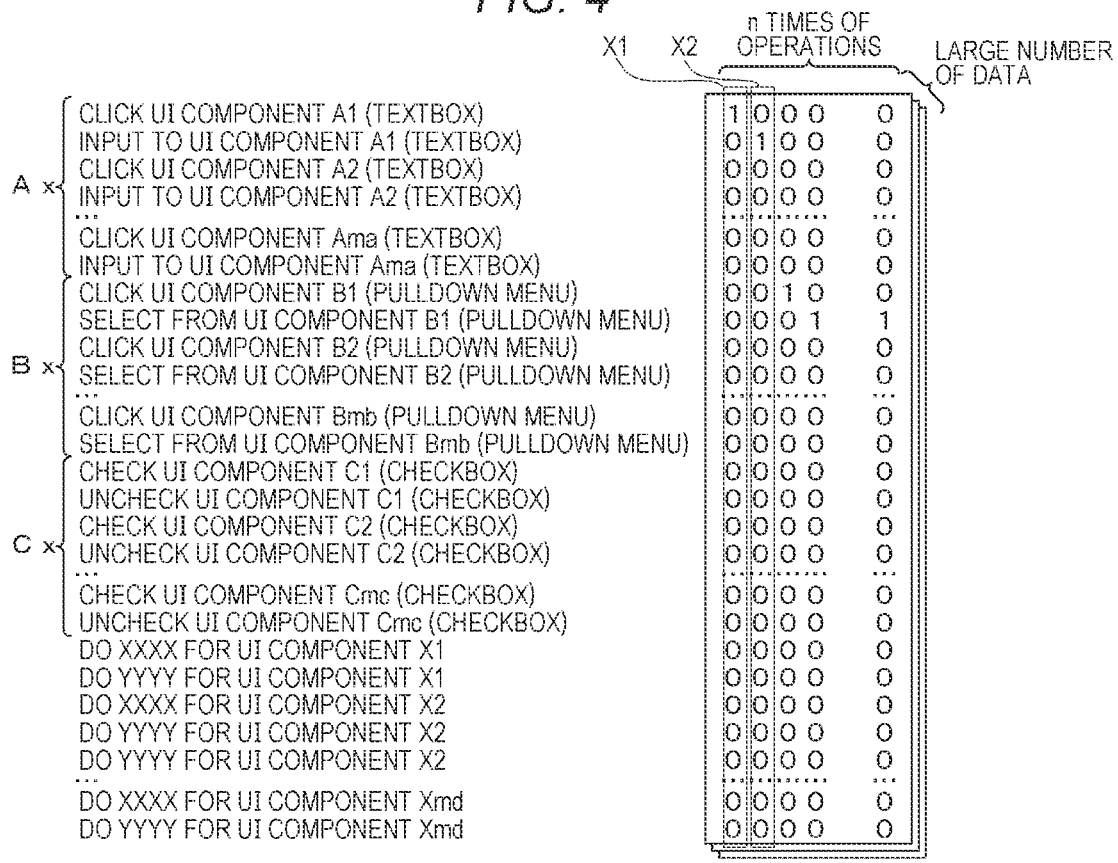
FIG. 4 is an explanatory diagram for describing a configuration example of learning data used for machine learning.

FIG. 4 is an explanatory diagram for describing a configuration example of learning data used for machine learning. As illustrated, the learning data specifically has a configuration in which n times of operations are represented in a matrix. Each row of matrix data represents a combination of an ID of a UI component used in the application and an operation type. Note that all of combinations used in the application are written out in a row direction. For example, a UI component Ax (A1 to Ama) relates to a textbox, a UI components Bx (B1 to Bmb) relates to a pulldown menu, and a UI component Cx (C1 to Cmc) relates to a checkbox.

The data in a column direction in the matrix data is the operation data of one operation, and arrangement of columns in the matrix data represents an operation order. That is, the learning data includes the operation data (operation history data) arranged in time series. Specifically, the learning data has a structure in which the operation data are arranged in the operation order from left to right. The operation data is data of a set of an ID (A1, A2, or the like) of the operated UI component and the type (click, input, or the like) of the performed operation. That is, the leftmost first column X1 in the matrix data in the drawing represents the operation of the UI component "click A1". The next column X2 on the right represents the operation of the UI component "input to A1".

As illustrated, a large number of pieces of learning data are used in the machine learning. Then, in the present embodiment, three types of learning data having different generation processes are prepared. The first learning data is generated on the basis of reference data regarding how to use the application prepared by an application creator side. Specifically, the first learning data is operation history data when a skilled person on the application creator side performs an operation, and is stored in advance in, for example, a server storage device (not illustrated) that can be read by the server device 10. By using the first learning data, for example, it is possible to learn an efficient operation without waste like an operation manual.

The second learning data is generated on the basis of actual use log data actually operated by a large number of users, that is, people in the world (for example, skilled persons). Specifically, the second operation data is generated by the server device 10 using the operation data transmitted from each application execution device 2 to the server device 10 via the network, and is stored in, for example, a server storage device (not illustrated). By using the second learning data, for example, it is possible to learn a highly convenient operation operated by a large number of other users. For example, both the first learning data and the second learning data are stored in the storage device 5 of the application execution device 2 by the communication control unit 41 and the operation history accumulation unit 42 illustrated in FIG. 2, and are provided to the learning update unit 44 by the operation history accumulation unit 42 at the time of learning. For example, the first learning data and the second learning data are appropriately updated by the server device 10, and the updated data is stored in the storage device 5.

The third learning data is generated on the basis of data regarding the individual application execution device 2 itself (the application execution device 2's own operation history data). Specifically, the third learning data is generated on the basis of operation history data configured by the operation data of the user operation by the input device 6 in the application execution device 2 alone. That is, the third learning data is configured by the operation data generated by the operation acquisition unit 43 and accumulated in the storage device 5 by the operation history accumulation unit 42. By using the third learning data, for example, it is possible to learn an operation suitable for work (for example, for a specific business) in the individual application execution device 2. Note that the third learning data may be for each application execution device 2, or may be for each user by identifying the user using a function of user authentication, or the like, for example. In this case, an operation suitable for each user can be learned. For example, the third learning data is provided to the learning update unit 44 by the operation history accumulation unit 42 at the time of learning.

The first learning data, the second learning data, and the third learning data are used for machine learning in proportions according to a predetermined setting. Note that the proportions may be configured to be appropriately settable by the user or may be automatically changed. Thereby, for example, it is possible to cause the user to finely learn the operation desired by the user, by (specifically, setting the ratio of the second learning data to be low) or the like for the user who does not want to refer to the usage of other users. Furthermore, all the three types of the first learning data, the second learning data, and the third learning data are not necessarily used for learning, and one or more of them may be used for learning. Furthermore, the learning data is not limited to these three types, and other types of learning data may be used.

Figure 5:
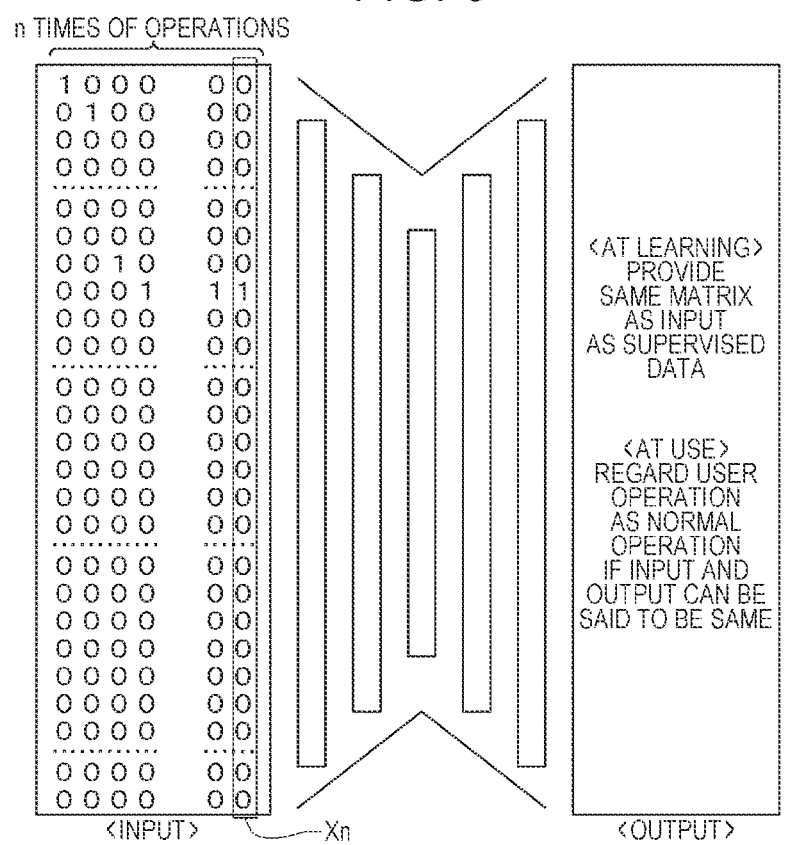
FIG. 5 is an explanatory diagram for describing a learning example and a use example of machine learning.

FIG. 5 is an explanatory diagram for describing a learning example and a use example of machine learning. "Input" and "output" on the right and left sides in the drawing represent input and output of the auto encoder, respectively, and the part between "input" and "output" represents an image of processing of the auto encoder (compression processing by the encoder and restoration processing by the decoder).

At the time of use, if the input and the output are the same (including substantially the same), the operation is regarded as a normal operation. For example, in the determination processing by the abnormal operation determination unit 45 described above, if the input and the output are the same (including substantially the same), the operation is regarded as a normal operation. That is, the latest n times of operation data (matrix data having a similar structure to the above-described learning data) are input to the trained learning model of the auto encoder, and the output and the input are compared and a difference is extracted Then, in a case where the difference is smaller than a predetermined threshold value, the operation can be regarded as a normal operation. Specifically, the first to fifth operations are set as one window, and the operation data corresponding to an operation of one window is input. Then, it is assumed that the first to fifth operations are determined to be normal operations as a result of comparison between the output and the input. Next, the second to sixth operations are set as the next window, and the operation data corresponding to the window is input. Then, in a case where an abnormal operation is determined as a result of the comparison between the output and the input, it can be determined that the sixth operation is the abnormal operation.

Furthermore, for example, in the above-described estimation processing in the normal operation estimation unit 46, the input and output are repeated while changing a parameter (way of setting 1) of the last column Xn of the input data as illustrated in the drawing. Then, in a case where there is a parameter with the same input and output (including substantially the same), the parameter (where 1 is set) is estimated as the next expected candidate for a normal operation. That is, the latest n times of operation data are sequentially input to the trained learning model of the auto encoder while changing the parameter in the last column, the output and the input are compared and the difference is extracted, and the operation indicated by the parameter having the difference smaller than the predetermined threshold value is estimated as the next candidate for a normal operation. The estimation of a normal operation may be performed by other methods. For example, a learning model including a tendency of an error may be applied, and 1 may be preferentially set to a portion considered to be a normal operation corresponding to the error.

At the time of learning, matrix data having the same structure as the operation data input to the auto encoder is given as supervised data. Specifically, the above-described learning update unit 44 performs learning using the above-described learning data so that the output of the auto encoder becomes the same as the input. That is, the learning update unit 44 adjusts and updates the weighting of the auto encoder (weighting of the encoder and the decoder) as described above.

[Operation Support Processing in First Embodiment]

Figure 6:
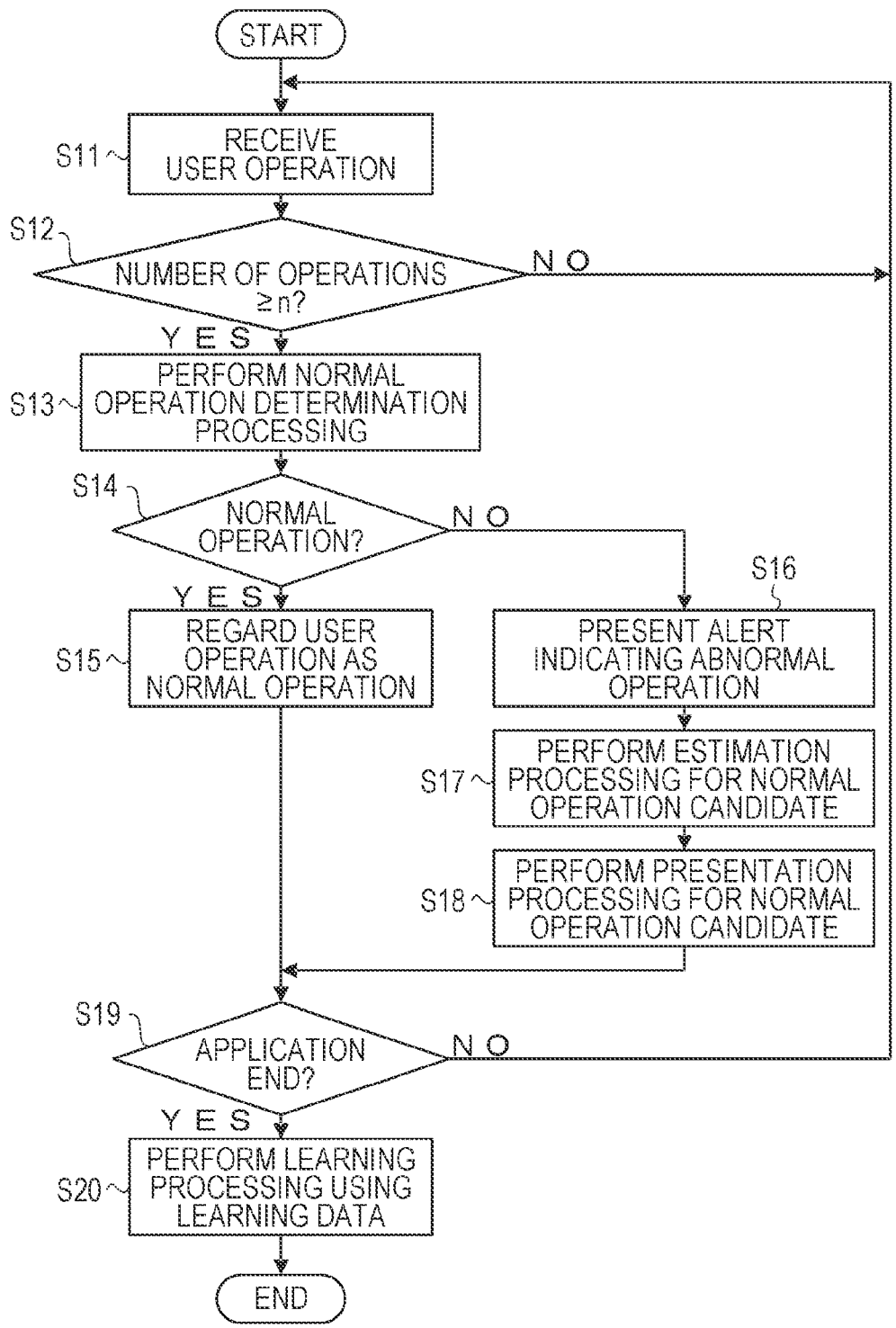
FIG. 6 is a flowchart illustrating an example of a flow of operation support processing according to the first embodiment.

Hereinafter, the operation support processing by the application execution device 2 will be described. FIG. 6 is a flowchart illustrating an example of a flow of the operation support processing according to the first embodiment. This operation support processing outputs an alert in a case where the user performs an abnormal operation, specifically, an operation completely different from a normal operation (for example, the operation as usual), and presents a visual operation guide regarding the candidate for a normal operation. Furthermore, in this operation support processing, learning is performed at the end of the application using the above-described learning data.

This operation support processing is executed, for example, when the application is activated in the application execution device 2. Note that the processing may be executed in conjunction with activation of the application or may be executed by a user instruction using the input device 6 or the like after activation of the application.

In the operation support processing, first, the user operation in the application is received by the operation acquisition unit 43 (step S11). Specifically, as described above, when the user operation is performed in the application, the operation acquisition unit 43 acquires the raw data from the input device 6 and generates the operation data using the acquired raw data. The generated operation data is provided to the operation history accumulation unit 42 and the abnormal operation determination unit 45. The operation history accumulation unit 42 accumulates the operation data in the storage device 5 and provides the operation data to the communication control unit 41. The communication control unit 41 provides the operation data to the server device 10 using the communication device 3. The server device 10 generates the above-described second learning data using the operation data provided from each application execution device 2.

Next, whether or not the number of times of the user operation in the application is n times or more is determined (step S12). For example, this determination is performed by the abnormal operation determination unit 45. In step S12, in the case where it is determined that the number of times of the user operation is not n times or more (NO), the processing returns to step S11 described above.

In step S12, in the case where it is determined that the number of times of the user operation is n times or more (YES), the abnormal operation determination unit 45 performs the determination processing of determining whether or not the user operation is a normal operation (step S13). Specifically, as described above, the abnormal operation determination unit 45 determines whether or not the user operation is a normal operation by applying the latest n times of operation data to the trained auto encoder.

Next, the abnormal operation determination unit 45 determines whether or not the user operation is determined to be a normal operation as a result of the determination processing in step S13 (step S14). Specifically, as described above, the abnormal operation determination unit 45 determines whether or not the input and the output of the auto encoder are the same (including substantially the same (the input≈the output)), and regards the user operation as a normal operation in the case where the input and the output are determined to be the same.

In the case where the user operation is determined to be a normal operation in step S14 (YES), processing of regarding the user operation as a normal operation is performed (specifically, nothing is performed) (step S15). In the case where the user operation is determined not to be a normal operation in step S14 (NO), the user operation is treated as an abnormal operation, the abnormal operation determination unit 45 determines to set an alert as the operation support information (first determination step), a notification of the determination is made to the support information presentation unit 47, and the support information presentation unit 47 presents the alert indicating an abnormal operation from the output device 7 to the user (step S16).

Moreover, the abnormal operation determination unit 45 provides the operation data provided from the operation acquisition unit 43 to the normal operation estimation unit 46, and the normal operation estimation unit 46 performs the estimation processing for the candidate for a normal operation and determines the candidate for a normal operation as the operation support information (step S17: second determination step). Specifically, as described above, the normal operation estimation unit 46 finds the candidate for a normal operation by setting a parameter other than the input data to the last column (last operation) of the input data (operation history data) and applying the operation data to the auto encoder, and provides the normal operation information indicating the found candidate for a normal operation to the support information presentation unit 47.

Next, the support information presentation unit 47 performs the presentation processing for the candidate for a normal operation (step S18). Specifically, the support information presentation unit 47 controls the output device 7 to output the operation guide indicating the normal operation information provided from the normal operation estimation unit 46, and presents the candidate for a normal operation to the user.

After the processing in steps S15 and S18, the learning update unit 44 determines whether or not the user has terminated the application (step S19). When it is determined in step S19 that the application has not been terminated (NO), the processing returns to step S11. On the other hand, in the case where it is determined in step S19 that the application has been terminated (YES), the learning update unit 44 performs the learning processing using the learning data (step S20). Specifically, as described above, the weighting of the auto encoder is updated by performing learning using the first learning data, the second learning data, and the third learning data in predetermined proportions. Then, the operation support processing ends.

Figure 7:
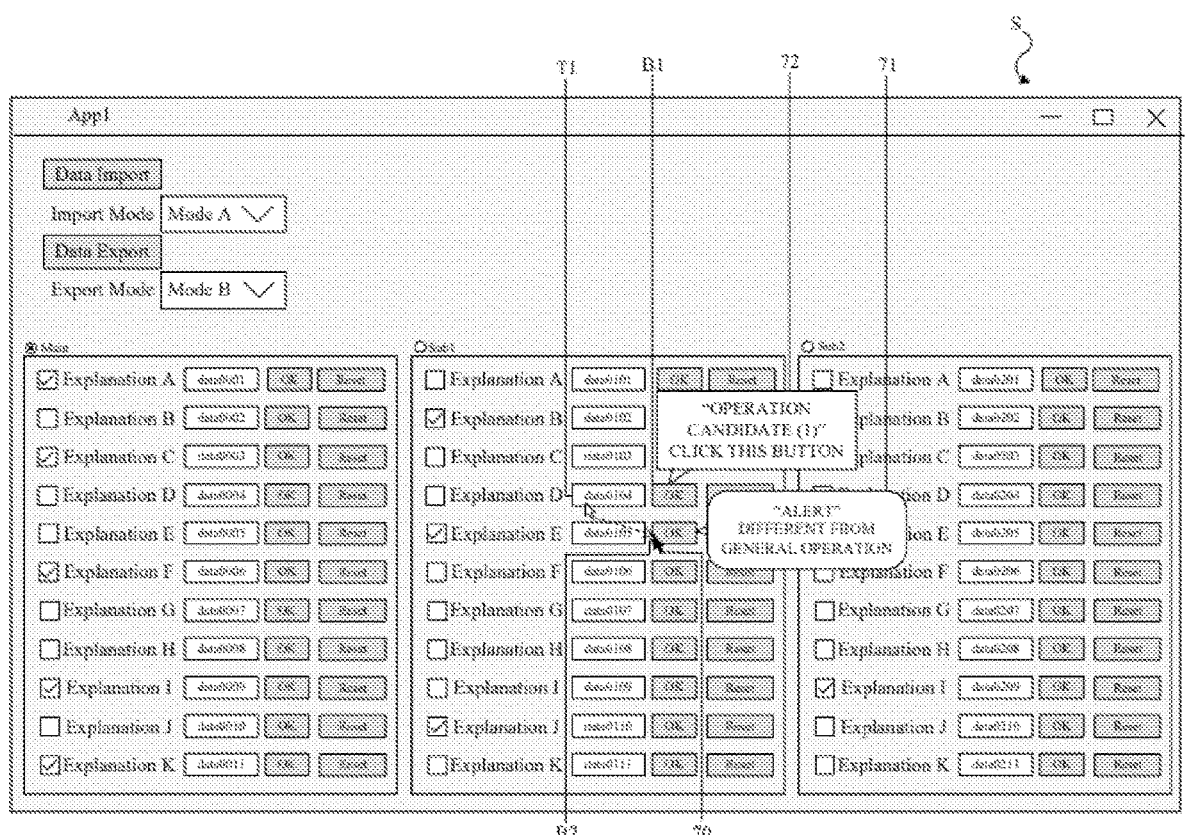
FIG. 7 is a diagram illustrating a presentation example of operation support information.
Figure 8:
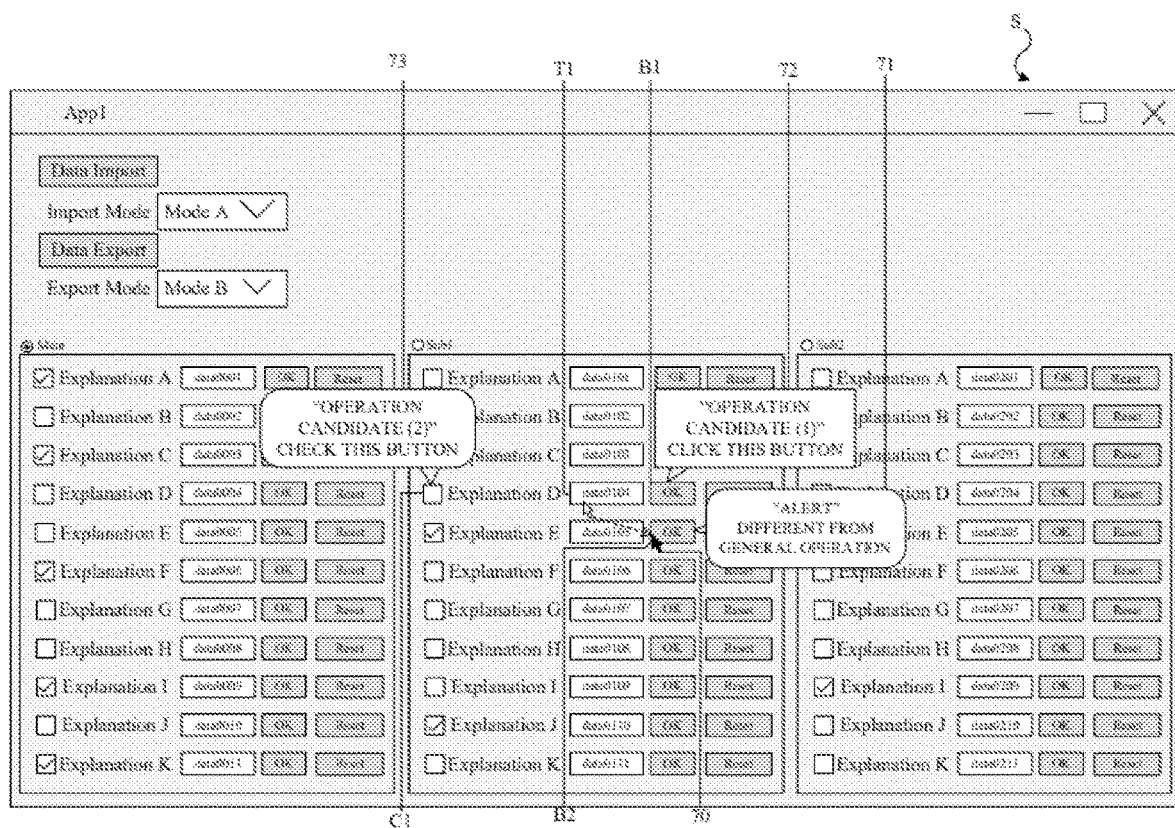
FIG. 8 is a diagram illustrating a presentation example of operation support information.

FIGS. 7 and 8 are diagrams illustrating presentation examples of the operation support information. On the operation screen S illustrated in FIG. 7, it is assumed that after data is input into a textbox T1, a cursor 70 was supposed to move to and click a button B1 but the cursor 70 has been moved to and clicked a button B2 at lower right of the button B1. In this case, when the button B2 is clicked, an alert of an abnormal operation is presented to the user. For example, as illustrated, a description such as "different from general operation" is displayed on the display using a balloon 71 at the portion of the UI component (button B2) operated by error. Furthermore, the operation guide representing a normal operation instead of the operation is presented to the user. For example, a frame of the UI component (button B1) of the candidate (operation candidate (1)) to be operated is emphasized, and a description such as "click this button" is displayed on the display using a balloon 72.

When there is a plurality of operation candidates, the plurality of operation candidates may be presented to the user. For example, as illustrated in FIG. 8, the frame of the UI component (checkbox C1) of another candidate (operation candidate (2)) to be operated may be emphasized, and a description such as "check this checkbox" may be displayed on the display using a balloon 73.

Note that the display form of the operation support information to the user is not limited to those illustrated in FIGS. 7 and 8. For example, the presentation to the user may be other than the emphasized display or the balloon display. Furthermore, only one of the alert and the operation candidate may be displayed without displaying both the alert and the operation candidate. Moreover, as the presentation to the user, a voice (auditory presentation) may be included or only a voice may be used.

As described above, the application execution device 2 determines whether or not the user operation is a normal operation at the time of the user operation in the application, and presents the alert to the user and presents the candidate for a normal operation to the user in the case where the user operation is determined not to be a normal operation. Thereby, in the case where the user operation is not a normal operation, the user can know the fact and can know the candidate for a normal operation, so that the operability of the user can be improved.

Furthermore, since the learning model trained by machine learning is used in the determination as to whether or not the user operation is a normal operation and the estimation of the candidate for a normal operation, it is possible to perform appropriate operation support according to learning without fixing a guide pattern.

Moreover, since the operation history data is used to generate the learning data, it is possible to perform appropriate operation support according to the operation history while using the application. For example, by using the third learning data as the learning data, optimization can be performed for each user of the individual application execution device 2, and thus unnecessary proposals and the like for user operations can be reduced.

2. Second Embodiment

In the above-described first embodiment, the candidate for a normal operation has been simply presented to the user in the presentation processing for the candidate for a normal operation by the support information presentation unit 47 (step S18), whereas a second embodiment is different in that, in the above-described presentation processing for a candidate for a normal operation by a support information presentation unit 47, processing according to an operation proficiency level of a user in an application is performed (for example, a presentation form is changed according to the operation proficiency level). Other points (for example, a schematic configuration of the entire system, a configuration of an application execution device 2, and the like) are similar and description thereof is omitted.

Figure 9:
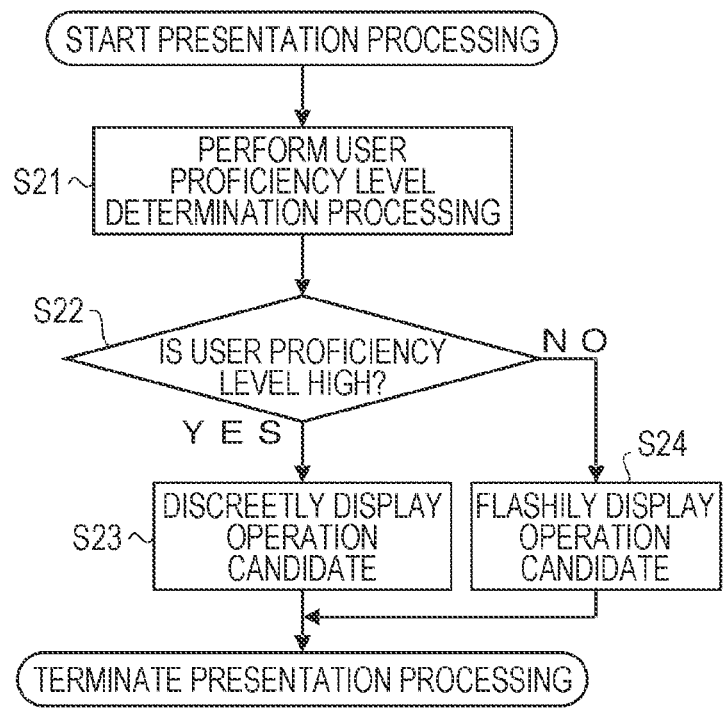
FIG. 9 is a flowchart illustrating an example of a flow of presentation processing for a candidate for a normal operation according to a second embodiment.

FIG. 9 is a flowchart illustrating an example of a flow of presentation processing for a candidate for a normal operation according to the second embodiment. As illustrated in FIG. 9, in the presentation processing for a candidate for a normal operation according to the present embodiment, first, determination processing of determining a user's operation proficiency level is performed (step S21). The operation proficiency level of the user is determined on the basis of operation content.

Specifically, the operation proficiency level of the user can be determined as follows. For example, the following elements are used to determine the proficiency level of the user.

First element: an average time (Δt) from when an operation is performed to when the next operation is performed Second element: a frequency of an abnormal operation (Fa)

Third element: a use frequency (Fs) of a shortcut key

Fourth element: a use time (T)

The reason for using the first element is that the shorter the time until the next operation, the higher the proficiency level. For example, the average time required for a certain number of times of operations in the past can be used as the first element.

The reason for using the second element is that the smaller the number of times of being regarded as abnormal, the higher the proficiency level. For example, the number of abnormal operations in a certain number of times of operations in the past can be used as the second element.

The reason for using the third element is that, in a case where there is a shortcut key, the higher the frequency of use of the shortcut key, the higher the proficiency level.

The reason for using the fourth element is that the longer an accumulated use time, the higher the proficiency level.

Specifically, the proficiency level (M) can be expressed by the following equation (1) using these elements. Note that a to d are predetermined coefficients. For example, in a case where there is no shortcut key, the value of the coefficient c corresponding thereto may be appropriately set to be small.

$$M = -a \times \Delta t - b \times Fa + c \times Fs + d \times T \quad (1)$$

Then, when M≥Mth (predetermined threshold value), the proficiency level can be determined to be high, and when M<Mth, the proficiency level can be determined to be low. Note that the determination of the operation proficiency level of the user is not limited to the determination using the equation (1). The determination may be made using two or more of these four elements. Specifically, an equation obtained by selecting these elements according to a use environment of the application or the like may be used. Furthermore, an equation using other elements may be used. Moreover, the proficiency level may be determined using another known proficiency level determination method.

Next, whether or not the operation proficiency level of the user has been determined to be high is determined on the basis of the result of the determination processing in step S21 (step S22). Specifically, as described above, as a result of using the equation (1), the proficiency level is determined to be high when M≥Mth, or the proficiency level is determined to be low when M<Mth. Note that the processing in steps S21 to S22 may be performed by a functional block different from the support information presentation unit 47.

In the case where the operation proficiency level of the user is determined to be high in step S22 (YES), the support information presentation unit 47 presents an operation guide indicating the candidate for a normal operation in a discreet manner (step S23). Furthermore, in the case where the operation proficiency level of the user is determined to be low in step S22 (NO), the support information presentation unit 47 presents the operation guide indicating the candidate for a normal operation in a flashy manner (step S24). Then, after such a guide is presented according to the operation proficiency level of the user, the presentation processing ends.

For example, as a way of changing the presentation, it is conceivable to devise a way of showing the guide, a UI component size, or the like according to the proficiency level of the user. Specifically, examples of the flashy presentation include displaying an arrow, a message, or the like more explicitly than normal display (for example, the size of the UI component is increased, and a text size of a message is increased). Furthermore, examples of the discreet presentation include making the size of the UI component smaller than the normal display and making the text size of the message smaller. Furthermore, more discreetly, for example, an ambiguous mark or the like may be simply displayed at a place where attention is to be attracted (specifically, a wave may be simply displayed to convey that there is something there).

As described above, in the presentation processing for the candidate for a normal operation, the operation guide indicating the candidate for a normal operation is presented in a flashy manner when the operation proficiency level of the user in the application is low, whereas the operation guide is presented in a discreet manner when the operation proficiency level becomes high. Therefore, the operation guide can be appropriately displayed according to the operation proficiency level of the user, and the user operability can be further improved.

Note that the operation proficiency level is not limited to two stages of high and low, and may be divided into three or more stages. As a result, the operation proficiency level of the user can be finely divided and the presentation can be changed for each divided proficiency level, and fine guide display according to the operation proficiency level can be performed.

3. Third Embodiment

In the above-described first embodiment, the first learning data, the second learning data, and the third learning data have been simply used for machine learning in the proportions according to the predetermined setting in the learning processing by the learning update unit 44 (step S20), whereas a third embodiment is different in performing processing according to an operation proficiency level in an application of a user (changing proportions of types of learning data to be used for machine learning according to the operation proficiency level) in the above-described learning processing by a learning update unit 44. Other points (for example, a schematic configuration of the entire system, a configuration of an application execution device 2, and the like) are similar and description thereof is omitted.

Figure 10:
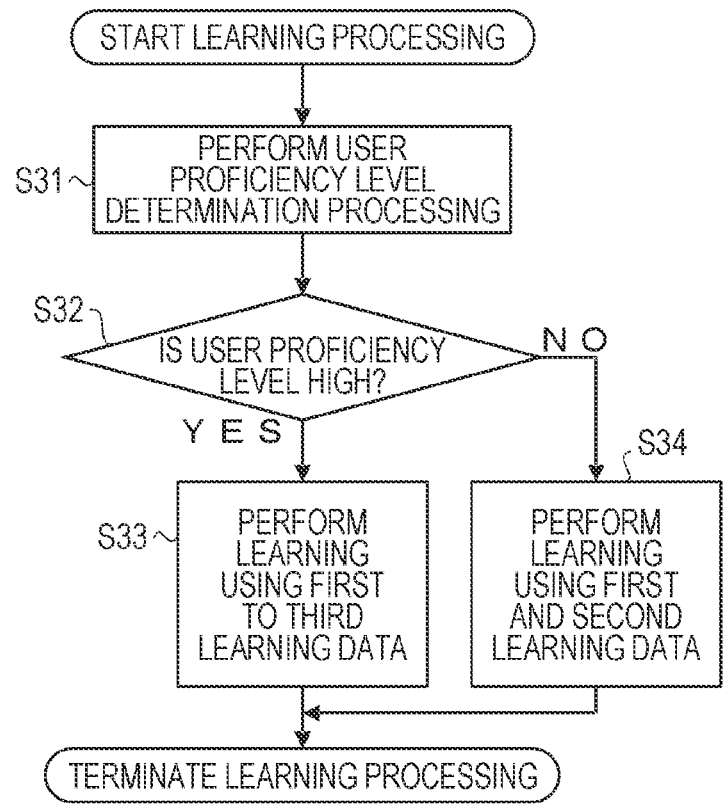
FIG. 10 is a flowchart illustrating an example of a flow of learning processing according to a third embodiment.

FIG. 10 is a flowchart illustrating an example of a flow of learning processing according to the third embodiment. As illustrated in FIG. 10, in the learning processing according to the present embodiment, first, determination processing of determining the operation proficiency level of the user is performed (step S31), and whether or not the operation proficiency level of the user is high is determined (step S32). Note that steps S31 to S32 are processing similar to steps S21 to S22 in the presentation processing for the candidate for a normal operation of the second embodiment. Thus detailed description thereof is omitted here.

In a case where the operation proficiency level of the user is determined to be high in step S32 (YES), learning using three types of first learning data, second learning data, and third learning data is performed by a learning update unit 44

(step S33). Specifically, weighting of an auto encoder is updated by performing learning using these three types of learning data as described above.

On the other hand, in a case where the operation proficiency level of the user is determined to be low in step S32 (NO), learning using two types of the first learning data and the second learning data is performed by the learning update unit 44 (step S34). Specifically, the weighting of the auto encoder is updated by performing learning using these two types of learning data, as described above. Then, after such learning according to the operation proficiency level of the user is performed, the learning processing is terminated.

As described above, in the learning processing, while the operation proficiency level of the user in the application is low, the learning is performed using the first learning data and the second learning data. In the case where the operation proficiency level becomes high, the learning is performed using the first learning data, the second learning data, and the third learning data. That is, only reference-type learning is performed while the user is unaccustomed to the operation, and learning according to the way of use by the user is performed when the user is accustomed to the operation. Therefore, the learning can be appropriately performed according to the operation proficiency level of the user, and the user operability can be further improved.

Note that, similarly to the second embodiment, the operation proficiency level is not limited to two stages of high and low, and may be divided into three or more stages. As a result, the operation proficiency level of the user can be finely divided, and the learning content can be changed for each divided proficiency level. For example, in a case where the operation proficiency level is determined to be high, the proportion of the third learning data may be increased within a range of an upper limit value including at least one of the first learning data or the second learning data according the operation proficiency level. By determining the upper limit value, it is possible to prevent the proportions of the first learning data and the second learning data in which a reference-type operation procedure can be learned from becoming too small.

4. Fourth Embodiment

Figure 11:
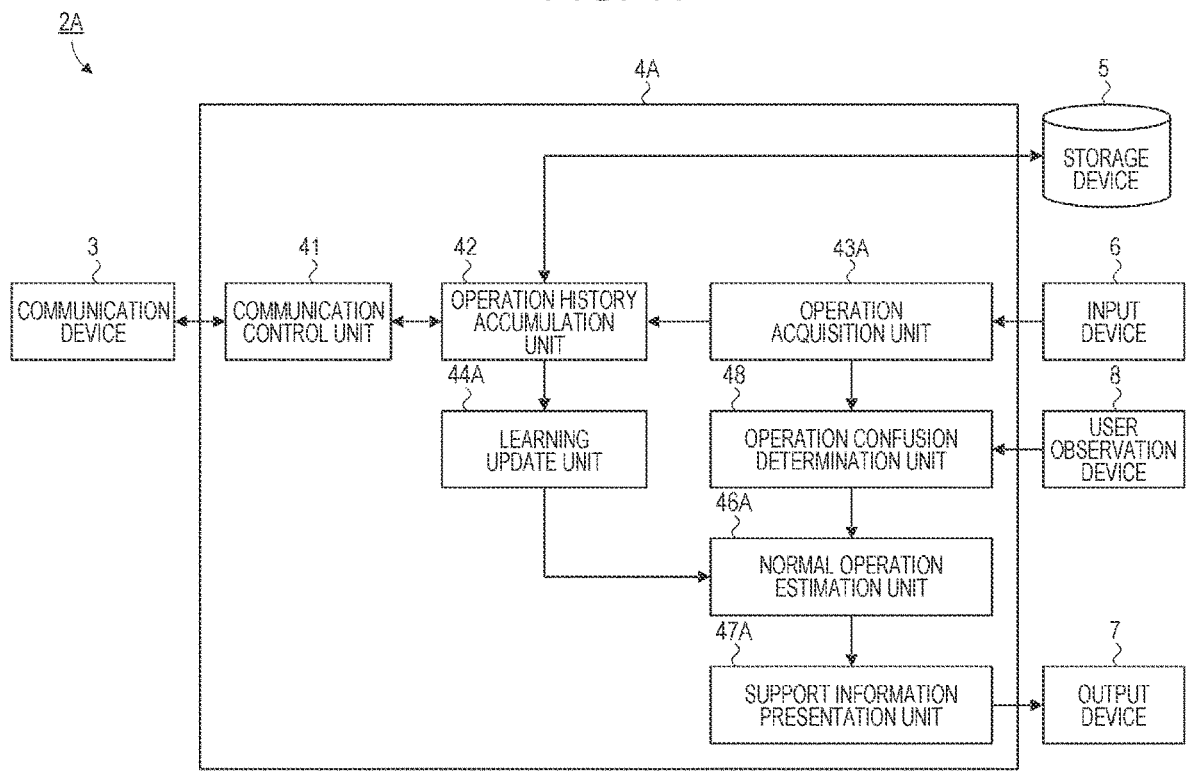
FIG. 11 is a block diagram illustrating a configuration example of an application execution device according to a fourth embodiment.

FIG. 11 is a block diagram illustrating a configuration example of an application execution device according to a fourth embodiment. An application execution device 2A illustrated in FIG. 11 is different from the application execution device 2 of the first embodiment in including a control device 4A in place of the above-described control device 4 of the application execution device 2 and including a user observation device 8. Other points (for example, a schematic configuration of the entire system, a configuration of elements given the same reference numerals as those of the application execution device 2, and the like) are similar and description thereof is omitted.

[Configuration of Application Execution Device 2A]

The user observation device 8 is a device that generates observation data obtained by observing a user's situation and provides the generated observation data to an operation confusion determination unit 48 (described below) of the control device 4A. Specifically, the user observation device 8 includes a camera capable of capturing an image of the user who is performing an operation in an application, and provides the operation confusion determination unit 48 with captured image data as the observation data. Note that the user observation device 8 is not limited thereto, and may be configured by a sensor or the like that measures and outputs brain waves, a heart rate, or the like.

The basic configuration of the control device 4A is similar to that of the control device 4 described above, but processing content in operation support processing is different. Therefore, functional blocks that function with execution of a program for operation support processing are different from those of the control device 4. Specifically, as illustrated in FIG. 11, the present embodiment is different from the first embodiment in including an operation acquisition unit 43A, a learning update unit 44A, the operation confusion determination unit 48, a normal operation estimation unit 46A, and a support information presentation unit 47A in place of the operation acquisition unit 43, the learning update unit 44, the abnormal operation determination unit 45, the normal operation estimation unit 46, and the support information presentation unit 47 (see FIG. 2) of the above-described control device 4. Hereinafter, the configuration of this difference will be described.

[Configuration of Control Device 4A]

The operation acquisition unit 43A has a function to acquire raw data of a user operation in the application from an input device 6, generate operation data using the acquired raw data, and provide the generated operation data to an operation history accumulation unit 42 and the operation confusion determination unit 48.

The learning update unit 44A has a function to perform machine learning using the operation data (learning data) provided from the operation history accumulation unit 42 and a function to provide a learning model trained by machine learning to the normal operation estimation unit 46A. Learning timing, a learning method, and the like in the learning update unit 44A are similar to those in the learning update unit 44 described above.

The operation confusion determination unit 48 has a function to determine whether or not the user is confused with the operation in the application and perform processing according to a determination result. Specifically, the operation confusion determination unit 48 determines that the user is confused as to what to do with the next operation, when it is determined that the operation data has not been provided from the operation acquisition unit 43A for a certain period of time or more, and the user is in a confused situation (for example, the line of sight continues to face a screen or the like) on the basis of the observation data. Note that this determination may be made according to either one of the above conditions.

For example, the length of the certain period of time may be determined on the basis of a user's normal operation time (for example, the operation time is stored for each application execution device 2 or for each user by user authentication or the like). That is, the faster the normal operation, the shorter the length of the certain period of time. As a result, accurate determination can be made with reference to the normal operation time of the user. Furthermore, the operation confusion determination unit 48 has a function to provide the determination result and the operation data provided from the operation acquisition unit 43A to the normal operation estimation unit 46A.

The normal operation estimation unit 46A is for determining, as operation support information, a candidate for the next operation (normal operation) in the case where the user is confused with the operation in the application, and has a function to perform estimation processing of estimating the candidate for the next operation using the above-described learning model. Specifically, the normal operation estimation unit 46A has a function to estimate the next operation using the operation data provided from the operation confusion determination unit 48 and the learning model provided from the learning update unit 44A, and provide the support information presentation unit 47A with next operation information indicating the estimated candidate for the next operation, in the case where the operation confusion determination unit 48 determines that the user is confused with the operation in the application.

For example, the normal operation estimation unit 46A estimates the candidate for the next operation using the operation data of n−1 times of operations including the operation data provided from the operation confusion determination unit 48 and the latest operation data (for example, data stored in a readable memory) and the learning model, and provides the support information presentation unit 47A with the next operation information indicating the estimated candidate for the next operation. For example, referring to the example illustrated in FIG. 5, left-aligned operation data of n−1 times of operation history is used as input data of an auto encoder, a parameter of the last column (n-th column) is changed, and input and output are repeated. Then, in a case where there is a parameter with the same input and output (including substantially the same), the parameter (where 1 is set) is estimated as a next expected operation candidate. That is, the latest n times of operation data are sequentially input to the trained learning model of the auto encoder while changing the parameter in the last column, and the output and the input are compared and a difference is extracted. Then, an operation indicated by the parameter having the difference smaller than a predetermined threshold value can be estimated as the candidate for the next operation.

The support information presentation unit 47A has a function to output, as the operation support information, an operation guide indicating the candidate for the next operation based on the next operation information provided from the normal operation estimation unit 46A.

[Operation Support Processing in Fourth Embodiment]

Figure 12:
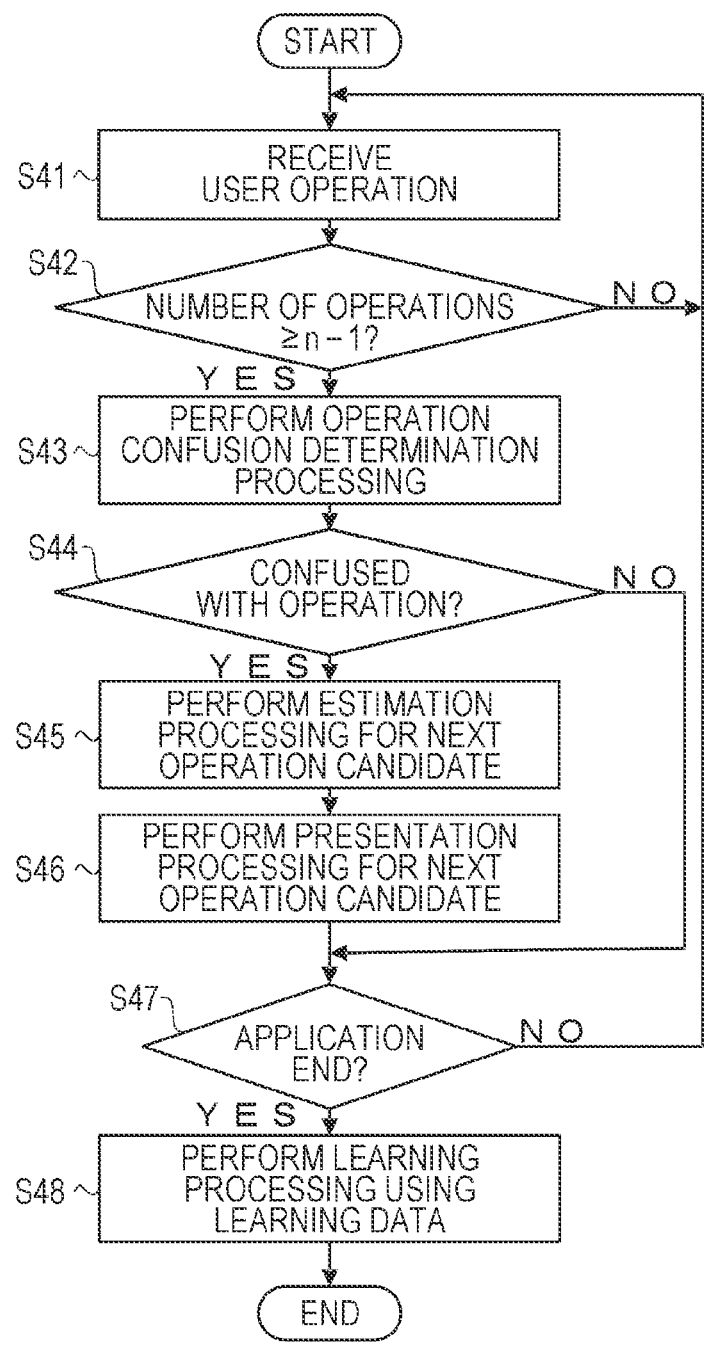
FIG. 12 is a flowchart illustrating an example of a flow of operation support processing according to the fourth embodiment.

Hereinafter, operation support processing by the application execution device 2A will be described. FIG. 12 is a flowchart illustrating an example of a flow of operation support processing according to the fourth embodiment. This operation support processing presents a visual guide for an operation in a case where the user is confused by having trouble or hesitation in the operation. Furthermore, in this operation support processing, learning is performed at the end of the application using the above-described learning data. Note that the execution (start) timing of the operation support processing is similar to the operation support processing by the application execution device 2 of the first embodiment described above.

In the operation support processing, first, the user operation in the application is received by the operation acquisition unit 43A (step S41). Specifically, the operation acquisition unit 43A acquires raw data of the user operation from the input device 6, and generates the operation data using the acquired raw data. The generated operation data is provided to the operation history accumulation unit 42 and the operation confusion determination unit 48. The operation history accumulation unit 42 accumulates the operation data in a storage device 5 and provides the operation data to a communication control unit 41. The communication control unit 41 controls a communication device 3 to provide the operation data to a server device 10 (see FIG. 1). The server device 10 generates second learning data using the operation data provided from each application execution device 2A.

Next, whether or not the number of operations is n−1 times or more is determined (step S42). For example, this determination is made by the operation confusion determination unit 48. In step S42, in the case where it is determined that the number of operations is not n−1 times or more (NO), the processing returns to step S41. In step S42, in the case where it is determined that the number of operations is n−1 times or more (YES), the operation confusion determination unit 48 performs operation confusion determination processing of determining whether or not the user is confused with the operation in the application (step S43). Specifically, as described above, the operation confusion determination unit 48 determines that the user is confused as to what to do with the next operation, when it is determined that the operation data has not been provided from the operation acquisition unit 43A for a certain period of time or more, and the user is in a confused situation on the basis of the observation data.

Next, the operation confusion determination unit 48 determines whether or not it is determined that the user is confused with the operation in the application as a result of the determination processing in step S43 (step S44). In the case where it is determined that in step S44 the user is confused (YES), the operation confusion determination unit 48 provides the operation data provided from the operation acquisition unit 43A to the normal operation estimation unit 46A, and the normal operation estimation unit 46A performs the estimation processing for the next operation candidate and determines the operation support information (step S45: third determination step). Specifically, as described above, the normal operation estimation unit 46A estimates the candidate for the next operation using the operation data of n−1 times of operations including the operation data provided from the operation confusion determination unit 48 and the latest operation data (for example, data stored in a readable memory) and the learning model, and provides the support information presentation unit 47A with the next operation information indicating the estimated candidate for the next operation.

Next, the support information presentation unit 47A performs the presentation processing for the next operation candidate (step S46). Specifically, the support information presentation unit 47A controls the output device 7 to output an operation guide indicating a candidate for the next operation from the output device 7 on the basis of the next operation information provided from the normal operation estimation unit 46A, and presents the candidate for the next operation to the user.

In the case where it is determined in step S44 that the user is not confused (NO) and after the processing in step S46, the learning update unit 44A determines whether or not the user has terminated the application (step S47). When it is determined in step S47 that the application has not been terminated (NO), the processing returns to step S41. On the other hand, in the case where it is determined in step S47 that the application has been terminated (YES), the learning update unit 44A performs the learning processing using the learning data (step S48). Specifically, similarly to the learning update unit 44 of the first embodiment described above, weighting of the auto encoder is updated by performing learning using the learning data. Then, the operation support processing ends.

As described above, the application execution device 2A determines whether or not the user is confused with the operation in the application at the time of the user operation in the application, and presents the next operation candidate to the user in the case where it is determined that the user is confused. Thereby, the user can know the next operation candidate and perform the operation based on the next operation candidate, and thus the operability of the user can be improved.

Furthermore, since the learning model trained by machine learning is used in the estimation of the next operation candidate, it is possible to perform appropriate operation support according to learning without fixing a guide pattern.

Moreover, since the operation history data is used to generate the learning data, it is possible to perform appropriate operation support according to the operation history while using the application. For example, by using the third learning data as the learning data, optimization can be performed for each user of the individual application execution device 2A, and thus unnecessary proposals and the like for user operations can be reduced.

5. Fifth Embodiment

Figure 13:
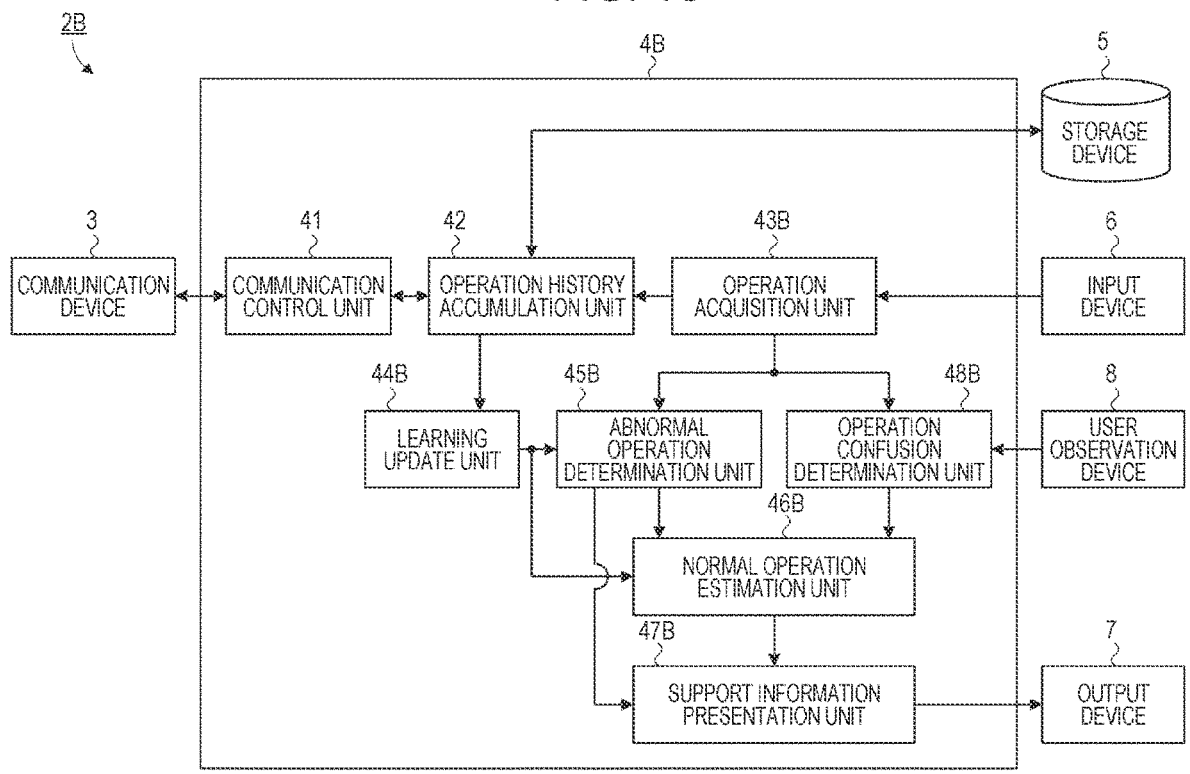
FIG. 13 is a block diagram illustrating a configuration example of an application execution device according to a fifth embodiment.

FIG. 13 is a block diagram illustrating a configuration example of an application execution device according to a fifth embodiment. An application execution device 2B illustrated in FIG. 13 is different from the application execution device 2A of the fourth embodiment in including a control device 4B in place of the above-described control device 4A. Other points (for example, a schematic configuration of the entire system, a configuration of elements given the same reference numerals as those of the application execution device 2A, and the like) are similar and description thereof is omitted.

[Configuration of Control Device 4B]

The control device 4B basically has a similar configuration to the above-described control device 4A, but has different processing content in operation support processing. Specifically, the control device 4B has a configuration that performs both the processing of the first embodiment and the processing of the fourth embodiment. Therefore, functional blocks that function with execution of a computer program for the operation support processing are different from those of the control device 4A. That is, as illustrated in FIG. 13, the present embodiment is different from the fourth embodiment in including an operation acquisition unit 43B, a learning update unit 44B, an operation confusion determination unit 48B, a normal operation estimation unit 46B, and a support information presentation unit 47B in place of the operation acquisition unit 43A, the learning update unit 44A, the operation confusion determination unit 48, the normal operation estimation unit 46A, and the support information presentation unit 47A (see FIG. 11) of the above-described control device 4A, and including an abnormal operation determination unit 45B. Hereinafter, the configuration of this difference will be described.

The operation acquisition unit 43B has a function to acquire raw data of a user operation in an application from an input device 6, generate operation data using the acquired raw data, and provide the generated operation data to an operation history accumulation unit 42, the abnormal operation determination unit 45B, and the operation confusion determination unit 48B.

The learning update unit 44B has a function to perform machine learning using the operation data (learning data) provided from the operation history accumulation unit 42 and a function to provide a learning model trained by the machine learning to the abnormal operation determination unit 45B and the normal operation estimation unit 46B. Learning timing, a learning method, and the like in the learning update unit 44B are as described above.

The abnormal operation determination unit 45B has a function to determine, when a user operation is performed by the input device 6, whether or not the operation is a normal operation, using the operation data provided from the operation acquisition unit 43B and the learning model provided from the learning update unit 44B, and performs processing according to a determination result, similarly to the abnormal operation determination unit 45 in the first embodiment described above. A specific determination method is similar to that of the abnormal operation determination unit 45, and detailed description thereof is omitted. Note that, in a case where the user operation is determined to be an abnormal operation, the abnormal operation determination unit 45B has a function to notify the support information presentation unit 47B of the abnormal determination and provide the normal operation estimation unit 46B with the operation data provided from the operation acquisition unit 43B.

The operation confusion determination unit 48B has a function to determine whether or not the user is confused with the operation in the application and perform processing according to a determination result. The method of determining whether or not the user is confused is similar to that of the operation confusion determination unit 48, and description thereof is omitted here. Furthermore, the operation confusion determination unit 48B has a function to provide the determination result and the operation data provided from the operation acquisition unit 43B to the normal operation estimation unit 46B.

The normal operation estimation unit 46B has a function to estimate a normal operation using the operation data provided from the abnormal operation determination unit 45B and the learning model provided from the learning update unit 44B, and provide the support information presentation unit 47B with normal operation information indicating a candidate for the estimated normal operation as a candidate for the normal operation, in the case where the abnormal operation determination unit 45B determines that the user operation is an abnormal operation, similarly to the normal operation estimation unit 46 in the first embodiment described above.

Furthermore, the normal operation estimation unit 46B has a function to estimate the next operation (normal operation) using the operation data provided from the operation confusion determination unit 48B and the learning model provided from the learning update unit 44B, and provide the support information presentation unit 47B with next operation information indicating a candidate for the estimated next operation as a candidate for the next operation, in the case where the operation confusion determination unit 48B determines that the user is confused with the operation in the application, similarly to the above-described normal operation estimation unit 46A.

The support information presentation unit 47B has a function to cause an output device 7 to output an alert to the user as operation support information in the case of receiving the notification of abnormal operation from the abnormal operation determination unit 45B. Furthermore, the support information presentation unit 47B has a function to output, as the operation support information, an operation guide indicating the candidate for the normal operation based on the normal operation information or the candidate for the next operation based on the next operation information provided from the normal operation estimation unit 46B.

[Operation Support Processing in Fifth Embodiment]

Figure 14:
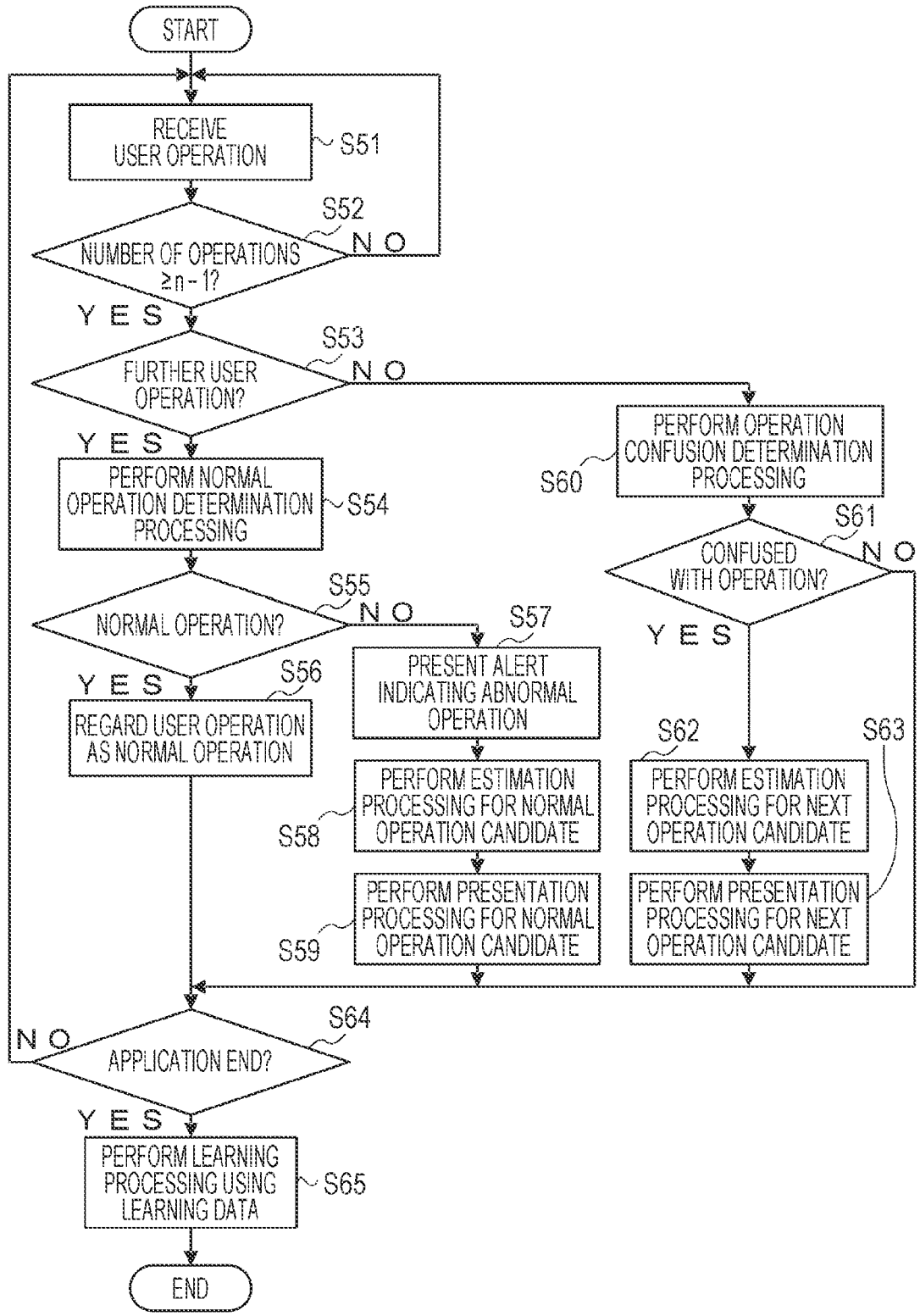
FIG. 14 is a flowchart illustrating an example of a flow of operation support processing according to the fifth embodiment.

Hereinafter, operation support processing by the application execution device 2B will be described. FIG. 14 is a flowchart illustrating an example of a flow of operation support processing according to the fifth embodiment. This operation support processing outputs an alert and notifies the user in a case where the user performs an abnormal operation, and presents a visual guide regarding a candidate for a normal operation. Furthermore, in a case where the user is confused with the operation, a visual guide for the operation is presented. Moreover, in this operation support processing, learning is performed at the end of the application using the above-described learning data. Note that the execution (start) timing of the operation support processing is similar to the operation support processing by the application execution device 2 of the first embodiment described above.

In the operation support processing, first, the operation acquisition unit 43B receives the user operation in the application (step S51). Specifically, the operation acquisition unit 43B acquires raw data of the user operation from the input device 6, and generates the operation data using the acquired raw data. The generated operation data is provided to the operation history accumulation unit 42, the abnormal operation determination unit 45B, and the operation confusion determination unit 48B. The operation history accumulation unit 42 accumulates the operation data in the storage device 5 and provides the operation data to the communication control unit 41. The communication control unit 41 controls the communication device 3 to provide the operation data to the server device 10 (see FIG. 1). The server device 10 generates the second learning data using the operation data provided from each application execution device 2B.

Next, whether or not the number of operations is n−1 times or more is determined (step S52). For example, this determination is made by the operation confusion determination unit 48. In step S52, in the case where it is determined that the number of operations is not n−1 times or more (NO), the processing returns to step S51. In step S52, in the case where it is determined that the number of operations is n−1 times or more (YES), whether or not there is further a user operation, that is, whether or not the number of operations is n times or more is determined (step S53). For example, this determination is performed by the abnormal operation determination unit 45B.

In step S53, in the case where it is determined that there is further the user operation (YES), the abnormal operation determination unit 45B performs the determination processing of determining whether or not the user operation is a normal operation (step S54). Specifically, as described above, the abnormal operation determination unit 45B determines whether or not the user operation is a normal operation by applying the latest n times of operation data to the trained auto encoder.

Next, the abnormal operation determination unit 45B determines whether or not the user operation is determined to be a normal operation as a result of the determination processing in step S54 (step S55). Specifically, as described above, the abnormal operation determination unit 45B determines whether or not the input and the output of the auto encoder are the same (including substantially the same (the input≈the output)), and regards the user operation as a normal operation in the case where the input and the output are determined to be the same.

In the case where the user operation is determined to be a normal operation in step S55 (YES), processing of regarding the user operation as a normal operation is performed (specifically, nothing is performed) (step S56). In the case where the user operation is determined not to be a normal operation in step S55 (NO), the user operation is treated as an abnormal operation, the abnormal operation determination unit 45B determines to set an alert as the operation support information (first determination step), a notification of the determination is made to the support information presentation unit 47B, and the support information presentation unit 47B presents the alert indicating an abnormal operation from the output device 7 to the user as the operation support information (step S57).

Moreover, the abnormal operation determination unit 45B provides the operation data provided from the operation acquisition unit 43B to the normal operation estimation unit 46B, and the normal operation estimation unit 46B performs the estimation processing of a candidate for a normal operation and determines the candidate for a normal operation as the operation support information (step S58: second determination step). Specifically, as described above, the normal operation estimation unit 46B finds the candidate for a normal operation by setting a parameter other than the input data to the last column (last operation) of the input data (operation history data) and applying the operation data to the auto encoder, and provides the normal operation information indicating the found candidate for a normal operation to the support information presentation unit 47B.

Next, the support information presentation unit 47B performs the presentation processing for the candidate for a normal operation (step S59). Specifically, the support information presentation unit 47B controls the output device 7 to output the operation guide indicating the candidate for a normal operation on the basis of the normal operation information provided from the normal operation estimation unit 46B, and presents the candidate for a normal operation to the user.

On the other hand, in step S53, in the case where it is determined that there is no further user operation (NO), the operation confusion determination unit 48B performs operation confusion determination processing of determining whether or not the user is confused with the operation in the application (step S60). Specifically, as described above, the operation confusion determination unit 48B determines that the user is confused as to what to do with the next operation, when it is determined that the operation data has not been provided from the operation acquisition unit 43B for a certain period of time or more, and the user is in a confused situation on the basis of the observation data.

Next, the operation confusion determination unit 48B determines whether or not it is determined that the user is confused with the operation in the application as a result of the determination processing in step S60 (step S61). In the case where it is determined in step S61 that the user is confused (YES), the operation confusion determination unit 48B provides the operation data provided from the operation acquisition unit 43B to the normal operation estimation unit 46B, and the normal operation estimation unit 46B performs the estimation processing for the next operation candidate and determines the operation support information (step S62: third determination step). Specifically, as described above, the normal operation estimation unit 46B estimates the candidate for the next operation using the operation data of n−1 times of operations including the operation data provided from the operation confusion determination unit 48B and the latest operation data (for example, data stored in a readable memory) and the learning model, and provides the support information presentation unit 47B with the next operation information indicating the estimated candidate for the next operation.

Next, the support information presentation unit 47B performs the presentation processing for the next operation candidate (step S63). Specifically, the support information presentation unit 47B controls the output device 7 to output the operation guide indicating the candidate for the next operation from the output device 7 on the basis of the next operation candidate provided from the normal operation estimation unit 46B, and presents the candidate for the next operation to the user.

In the case where it is determined in step S61 that the user is not confused (NO) and after the processing in steps S56 and S59, the learning update unit 44B determines whether or not the user has terminated the application (step S64). In the case where it is determined in step S64 that the application has not been terminated (NO), the processing returns to step S51. On the other hand, in the case where it is determined in step S64 that the application has been terminated (YES), the learning update unit 44B performs the learning processing using the learning data (step S65). Specifically, similarly to the learning update unit 44 of the first embodiment described above, weighting of the auto encoder is updated by performing learning using the learning data. Then, the operation support processing ends.

As described above, the application execution device 2B determines whether or not the user operation is a normal operation at the time of the user operation in the application, and presents the alert to the user and presents the candidate for a normal operation to the user in the case where it is determined that the user operation is not a normal operation. Thereby, in the case where the user operation is not a normal operation, the user can know the fact and can know the candidate for a normal operation, so that the operability of the user can be improved.

Furthermore, the application execution device 2B determines whether or not the user is confused with the operation in the application at the time of the user operation in the application, and presents the next operation candidate to the user in the case where it is determined that the user is confused. Thereby, the user can know the next operation candidate and perform the operation based on the next operation candidate, and thus the operability of the user can be improved.

Moreover, since the learning model trained by machine learning is used in the determination as to whether or not the user operation is a normal operation, the estimation of the normal operation candidate, and the estimation of the next operation candidate, it is possible to perform appropriate operation support according to learning without fixing a guide pattern.

Furthermore, since the operation history data is used to generate the learning data, appropriate operation support according to the operation history can be performed while using the application. For example, by using the third learning data as the learning data, optimization can be performed for each user of the individual application execution device 2B, and thus unnecessary proposals and the like for user operations can be reduced.

6. Modification

Although the favorable embodiments of the present disclosure have been specifically described, the content of the present disclosure is not limited to the above-described embodiments, and various modifications can be made.

For example, in the operation support system 1 according to the first embodiment described above, the configuration in which the plurality of application execution devices 2 is connected to one server device 10 has been exemplified, but the system configuration is not limited thereto. For example, a plurality of server devices 10 may be provided, and the server devices 10 may be connected to the network. Furthermore, the server device 10 may not be used. Moreover, a cloud environment may be constructed, and some of the functional blocks accompanying the execution of the operation support processing may be executed on the cloud side.

Figure 15:
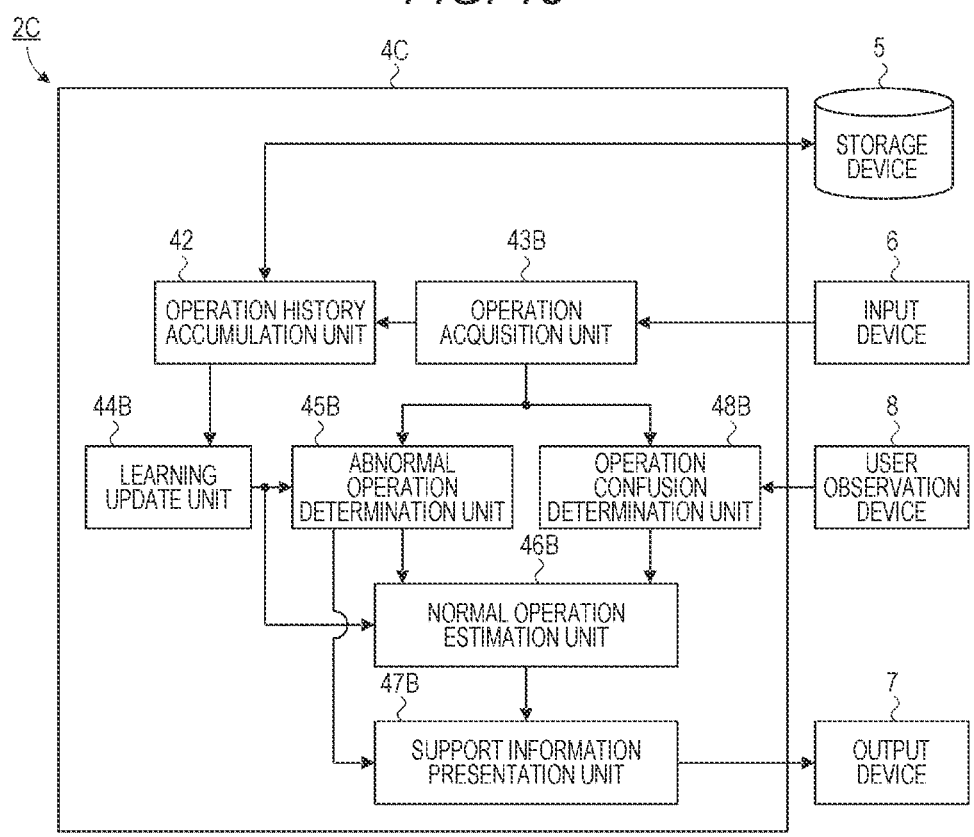
FIG. 15 is a block diagram illustrating a configuration example of an application execution device according to a modification.

FIG. 15 is a block diagram illustrating a configuration example of an application execution device according to a modification. An application execution device 2C illustrated in FIG. 15 is different from the application execution device 2B according to the fifth embodiment in including a control device 4C in place of the control device 4B of the application execution device 2B and not including the communication device 3. Other points (for example, configurations of elements given the same reference numerals as those of the application execution device 2B, and the like) are similar, and description thereof is omitted.

The control device 4C is different from the control device 4B in not including the communication control unit 41 in the control device 4B described above, but other configurations are similar to those of the control device 4B described above.

As described above, even in the structure not connected to the server device 10 (see FIG. 1), similar effects to those of the above-described fifth embodiment can be obtained. Note that, in this case, the first learning data and the second learning data may be stored in advance in the storage device 5. Only the third learning data may be used without using the first learning data and the second learning data for learning. The configuration of this modification can also be applied to other embodiments and the like.

Figure 16:
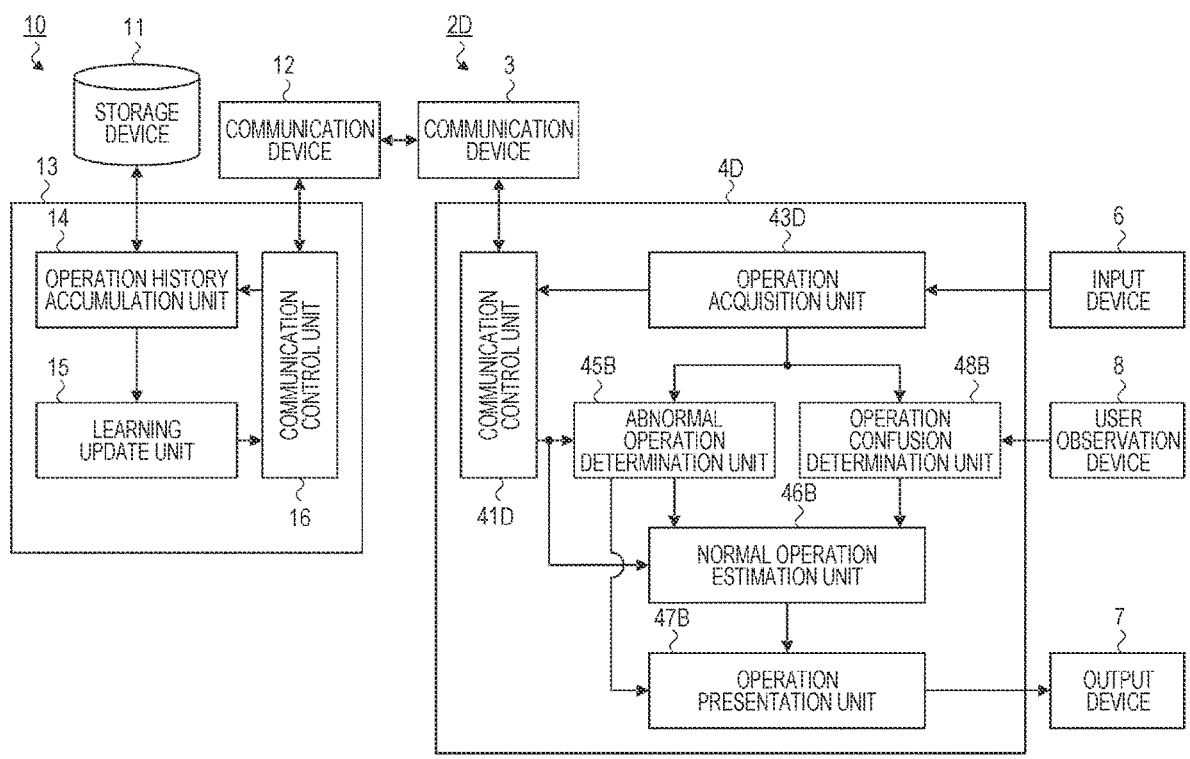
FIG. 16 is a block diagram illustrating a configuration example of a server device and an application execution device according to a modification.

FIG. 16 is a block diagram illustrating a configuration example of an application execution device according to a modification. Am application execution device 2D illustrated in FIG. 16 is different from the application execution device 2B according to the fifth embodiment in including a control device 4D in place of the control device 4B of the application execution device 2B described above and not including the storage device 5. Specifically, the application execution device 2D is different from the application execution device 2B according to the fifth embodiment described above in that some of the configuration elements (specifically, the operation history accumulation unit 42 and the learning update unit 44B) of the control device 4B described above are configured to be executed on a cloud side (in the illustrated example, on the server device 10 side). Other points (for example, configurations of elements given the same reference numerals as those of the application execution device 2B, and the like) are similar, and description thereof is omitted.

A communication control unit 41D included in the control device 4D of the application execution device 2D (local side) has a function to control the communication device 3 to transmit and receive data associated with the operation support processing to and from the server device 10 (cloud side). Specifically, the communication control unit 41D acquires the learning model from the server device 10 and provides the acquired learning model to the abnormal operation determination unit 45B and the normal operation estimation unit 46B. Furthermore, the communication control unit 41D transmits the operation data provided from the operation acquisition unit 43 to the server device 10.

The operation acquisition unit 43D has a function to acquire raw data of the user operation in the application from the input device 6, generate operation data using the acquired raw data, and provide the generated operation data to the communication control unit 41D, the abnormal operation determination unit 45B, and the operation confusion determination unit 48B.

The server device 10 includes a cloud-side storage device 11, a cloud-side communication device 12, and a cloud-side control device 13. The cloud-side storage device 11 has, for example, a configuration similar to the storage device 5 described above, and stores first learning data, second learning data, and third learning data described above. Note that the application (main unit) and the operation support program may be on either the cloud side or the local side.

The cloud-side communication device 12 is a device for network connection with the application execution device 2D. The server device 10 is configured to be able to transmit and receive various data to and from the application execution device 2D via the network by the cloud-side communication device 12.

The cloud-side control device 13 includes the operation history accumulation unit 14, the learning update unit 15, and the communication control unit 16. The operation history accumulation unit 14 has a function to accumulate the operation data provided from the communication control unit 16 in the cloud-side storage device 11. Furthermore, the operation history accumulation unit 14 has a function to read the operation data (learning data) necessary for machine learning from the cloud-side storage device 11 and provide the read operation data to the learning update unit 15.

The learning update unit 15 has a function to perform machine learning using the operation data provided from the operation history accumulation unit 14 and a function to provide a learning model trained by the machine learning to the communication control unit 16. Specifically, the learning update unit 44 performs machine learning at the end of the application. Learning timing, a learning method, and the like in the learning update unit 15 are similar to those in the learning update unit 44B described above.

The communication control unit 16 has a function to control the cloud-side communication device 12 to transmit and receive data associated with the operation support processing to and from the application execution device 2D. Specifically, the communication control unit 16 acquires the operation data from the application execution device 2D, and provides the acquired operation data to the operation history accumulation unit 14. Furthermore, the communication control unit 16 transmits the learning model provided from the learning update unit 15 to the application execution device 2D.

In the application execution device 2D, in the case where there is the user operation in the application by the input device 6, the operation data generated by the operation acquisition unit 43D is provided to the communication control unit 41D, and the operation data is transmitted to the server device 10 by the communication control unit 41D. On the server device 10 side, the communication control unit 16 receives the operation data and provides the operation data to the operation history accumulation unit 14. Then, the operation history accumulation unit 14 accumulates the operation data in the cloud-side storage device 11. Then, the third learning data is generated and stored in addition to the first learning data and the second learning data. Then, the learning update unit 15 performs the machine learning using the first learning data, the second learning data, and the third learning data as appropriate.

At the time of determination by the abnormal operation determination unit 45B of the application execution device 2D, and at the time of estimation by the normal operation estimation unit 46B, the communication control unit 16 transmits the trained learning model to the application execution device 2D. In the application execution device 2D, this learning model is received by the communication control unit 41D, and the received learning model is provided to the abnormal operation determination unit 45B and the normal operation estimation unit 46B.

As described above, even with the configuration in which some of the functions of the application execution device 2B are executed on the cloud side, similar effects to those of the fifth embodiment described above can be achieved. The configuration of this modification can also be applied to other embodiments and the like.

Moreover, for example, in the second embodiment and the third embodiment described above, the presentation and learning in the application execution device 2 of the first embodiment have been applied, but another embodiment or the like may be applied. In addition, processing combining the presentation processing of the second embodiment and the learning processing of the third embodiment may be performed. As described above, the matters described in each embodiment and modification may be applied to other embodiments and modifications as much as possible.

The content of the operation support information in the above-described embodiments may be combined as appropriate. Furthermore, the operation support information may be output by voice or vibration. Furthermore, as another example of the processing according to the determination result of the operation proficiency level, a comment according to the proficiency level may be added to the operation support information. For example, processing of presenting a comment such as "unusual" together with the operation support information to the user in a case where the user having a high operation proficiency level performs an operation that is not a normal operation.

The present disclosure can also employ the following configurations.

(1)

An information processing device including:

a control unit configured to perform processing using a learning model trained by machine learning for a user operation in an application and determine operation support information for operation support to be presented to a user according to a result of the processing.

(2)

The information processing device according to (1), in which the operation support information includes a candidate for a normal operation in place of the user operation in a case where the user operation in the application is not a normal operation, and the processing using a learning model is estimation processing of estimating the candidate for a normal operation.

(3)

The information processing device according to (1) or (2), in which the operation support information includes a next operation candidate in a case where the user is confused with an operation in the application, and the processing using a learning model is estimation processing of estimating the next operation candidate.

(4)

The information processing device according to any one of (1) to (3), in which the processing using a learning model is determination processing of determining whether or not the user operation in the application is a normal operation.

(5)

The information processing device according to (4), in which the operation support information includes an alert to be presented to the user in a case where it is determined that the user operation is not a normal operation.

(6)

The information processing device according to any one of (1) to (5), in which the control unit determines an operation proficiency level of the user in the application and performs processing according to a result of the determination.

(7)

The information processing device according to (6), in which the control unit changes a presentation form of the operation support information according to the result of the determination result of the operation proficiency level.

(8)

The information processing device according to (6) or (7), in which the machine learning is performed using a plurality of types of learning data having different generation processes, and proportions of the types of learning data to be used for the machine learning are changed according to a result of the determination of the operation proficiency level.

(9)

The information processing device according to (8), in which the learning data includes three types of first learning data based on reference data prepared by an application creator side, second learning data based on actual use log data of a large number of users, and third learning data based on information processing device's own operation history data, and the first learning data and the second learning data are used in a case where it is determined that the operation proficiency level is lower than a predetermined level, and machine learning is performed using the first learning data, the second learning data, and the third learning data in a case where it is determined that the operation proficiency level is higher than a predetermined level.

(10)

The information processing device according to (9), in which, in the case where it is determined that the operation proficiency level is higher than a predetermined level, the proportion of the third learning data is increased within a range of an upper limit value including at least one of the first learning data or the second learning data according to a level of the operation proficiency level.

(11)

The information processing device according to any one of (6) to (10), in which the operation proficiency level of the user is determined on the basis of operation content.

(12)

The information processing device according to (11), in which the operation content includes two or more elements among four elements of an average time from an operation to a next operation, a frequency of an abnormal operation, a use frequency of a shortcut key, and an accumulated use time of the application.

(13)

The information processing device according to any one of (1) to (12), in which the control unit performs the machine learning at predetermined timing after the user operation.

(14)

The information processing device according to any one of (1) to (13), in which the operation support information is presented to the user via an output unit.

(15)

An information processing method including:

by a control unit, performing processing using a learning model trained by machine learning for a user operation in an application and determining operation support information for operation support to be presented to a user according to a result of the processing.

(16)

A program for causing a computer to execute an information processing method including, by a control unit, performing processing using a learning model trained by machine learning for a user operation in an application and determining operation support information for operation support to be presented to a user according to a result of the processing.

REFERENCE SIGNS LIST 2, 2A, 2B, 2C, and 2D Application execution device
4, 4A, 4B, 4C, and 4D Control device
45 and 45B Abnormal operation determination unit
46, 46A, and 46B Normal operation estimation unit
47, 47A, and 47B Support information presentation unit
48 and 48B Operation confusion determination unit

The invention claimed is:

1. An information processing device, comprising:
a control unit configured to:
determine an operation proficiency level of a user in an application;
modify, based on the determined operation proficiency level of the user, proportions of a plurality of types of learning data of a learning model trained by machine learning, wherein the plurality of types of learning data have different generation processes;
perform, based on the learning model, processing for a user operation in the application; and
determine, based on a result of the processing, operation support information for operation support to the user.

2. The information processing device according to claim 1, wherein
the operation support information includes a candidate for a normal operation in place of the user operation in a case where the user operation in the application is not the normal operation, and
the processing based on the learning model is estimation processing for estimation of the candidate for the normal operation.

3. The information processing device according to claim 1, wherein
the operation support information includes a next operation candidate in a case where the user is confused with an operation in the application, and
the processing based on the learning model is estimation processing for estimation of the next operation candidate.

4. The information processing device according to claim 1, wherein the processing based on the learning model is determination processing for determination of the user operation in the application is a normal operation.

5. The information processing device according to claim 4, wherein the operation support information includes an alert to the user in a case where it is determined that the user operation is not the normal operation.

6. The information processing device according to claim 1, wherein the control unit is further configured to perform the processing based on the determined operation proficiency level of the user.

7. The information processing device according to claim 6, wherein the control unit is further configured to change a presentation form of the operation support information based on determined operation proficiency level.

8. The information processing device according to claim 1, wherein the plurality of types of learning data includes:
   first learning data based on reference data from an application creator side,
   second learning data based on actual use log data of a plurality of users,
   third learning data based on operation history data of the information processing device,
   the machine learning is based on the first learning data and the second learning data in a case where the determined operation proficiency level is lower than a specific level, and
   the machine learning is based on the first learning data, the second learning data, and the third learning data in a case where the determined operation proficiency level is higher than the specific level.

9. The information processing device according to claim 8, wherein, in the case where the determined operation proficiency level is higher than the specific level, a proportion of the third learning data is increased within a range of an upper limit value including at least one of the first learning data or the second learning data according to a level of the operation proficiency level.

10. The information processing device according to claim 1, wherein the control unit is further configured to determine the operation proficiency level of the user based on operation content.

11. The information processing device according to claim 10, wherein the operation content includes at least one of an average time from an operation to a next operation, a frequency of an abnormal operation, a use frequency of a shortcut key, and an accumulated use time of the application.

12. The information processing device according to claim 1, wherein the control unit is further configured to perform the machine learning at a specific timing after the user operation.

13. The information processing device according to claim 1, wherein the operation support information is presented to the user via an output unit.

14. An information processing method, comprising:
   in a control unit:
      determining an operation proficiency level of a user in an application;
      modifying, based on the determined operation proficiency level of the user, proportions of a plurality of types of learning data of a learning model trained by machine learning, wherein the plurality of types of learning data have different generation processes;
      performing, based on the learning model, processing for a user operation in the application; and
      determining, based on a result of the processing, operation support information for operation support to the user.

15. A non-transitory computer-readable medium having stored thereon, computer-executable instructions which, when executed by a computer, cause the computer to execute operations, the operations comprising:
   determining an operation proficiency level of a user in an application;
   modifying, based on the determined operation proficiency level of the user, proportions of a plurality of types of learning data of a learning model trained by machine learning, wherein the plurality of types of learning data have different generation processes;
   performing, based on the learning model, processing for a user operation in the application; and
   determining, based on a result of the processing, operation support information for operation support to the user.

* * * * *